(12) United States Patent
Tanigawa et al.

(10) Patent No.: US 7,595,730 B2
(45) Date of Patent: Sep. 29, 2009

(54) STATE RECOGNITION TAG

(75) Inventors: Toru Tanigawa, Osaka (JP); Shusaku Okamoto, Osaka (JP); Osamu Yamada, Nara (JP); Yoshihiko Matsukawa, Nara (JP); Tomonobu Naruoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 382 days.

(21) Appl. No.: 11/633,105

(22) Filed: Dec. 1, 2006

(65) Prior Publication Data

US 2007/0075411 A1 Apr. 5, 2007

Related U.S. Application Data

(63) Continuation of application No. PCT/JP2005/010063, filed on Jun. 1, 2005.

(30) Foreign Application Priority Data

Jun. 2, 2004 (JP) .............................. 2004-164677

(51) Int. Cl.
G08B 13/14 (2006.01)
(52) U.S. Cl. .................................. 340/572.1; 340/10.1
(58) Field of Classification Search .............. 340/572.1, 340/10.1, 505
See application file for complete search history.

(56) References Cited

U.S. PATENT DOCUMENTS

| | | |
|---|---|---|
| 5,532,692 A | 7/1996 | Tatsuya et al. |
| 6,073,856 A | 6/2000 | Takahashi et al. |
| 6,465,880 B1 | 10/2002 | Dobashi et al. |

FOREIGN PATENT DOCUMENTS

| | | | |
|---|---|---|---|
| DE | 2947962 A | * | 6/1980 |
| EP | 0 587 115 A2 | | 3/1994 |
| EP | 0 901 101 A2 | | 3/1999 |
| JP | 06/156691 A | | 6/1994 |
| JP | 09-212610 A | | 8/1997 |
| JP | 10-039758 A | | 2/1998 |
| JP | 11-073483 A | | 3/1999 |
| JP | 11-126245 A | | 5/1999 |
| JP | 2002-060012 A | | 2/2002 |
| JP | 2002-362613 A | | 12/2002 |
| JP | 2003-123046 A | | 4/2003 |
| JP | 2003123046 A | * | 4/2003 |
| JP | 2004-045944 A | | 2/2004 |

* cited by examiner

Primary Examiner—Toan N Pham
Assistant Examiner—Travis R Hunnings
(74) Attorney, Agent, or Firm—Harness, Dickey & Pierce, PLC

(57) ABSTRACT

A state recognition tag is configured to include a tag main body, and a tag fragment separable from the tag main body, and each of the tag main body and the tag fragment is provided with an information holding unit storing therein information to be transmitted, a separation-state recognizing unit which recognizes a separation state between the tag main body and the tag fragment, a control unit which exercises transmission control for transmitting the information from the information holding unit based on the separation state, and an electric power supplying unit which supplies electric power to the information holding unit, the separation-state recognizing unit, and the control unit. Regardless of whether the tag main body and the tag fragment are connected to each other or separated from each other, both the tag main body and the tag fragment can function as tags as needed. Furthermore, different information can be provided to a user according to the separation state between the tag main body and the tag fragment.

8 Claims, 47 Drawing Sheets

| LOGIC CIRCUIT \ SEPARATION STATE | CONNECTED AT 411 | SEPARATED AT 411 |
|---|---|---|
| 404 | ○ | × |
| 405 | × | ○ |
| 409 | × | ○ |

○ : CURRENT IS APPLIED
× : NO CURRENT IS APPLIED

Fig.5

| IC CHIP / SEPARATION STATE | CONNECTED AT 411 | SEPARATED AT 411 |
|---|---|---|
| 406 | ○ | × |
| 407 | × | ○ |
| 410 | × | ○ |

○ : ELECTRIC POWER IS SUPPLIED TO IC CHIP
× : NO ELECTRIC POWER IS SUPPLIED TO IC CHIP

Fig.7A

| LOGIC CIRCUIT / SEPARATION STATE | ALL ARE CONNECTED | SEPARATED AT 625 | SEPARATED AT 626 | SEPARATED AT 625 AND 626 |
|---|---|---|---|---|
| 605 | ○ | × | × | × |
| 606 | ○ | × | ○ | × |
| 607 | × | ○ | ○ | ○ |
| 608 | × | ○ | × | ○ |
| 609 | × | × | ○ | × |
| 614 | × | ○ | × | ○ |
| 615 | ○ | ○ | × | × |
| 616 | × | × | ○ | ○ |
| 617 | × | ○ | × | ○ |
| 618 | × | ○ | × | × |
| 619 | × | × | × | ○ |
| 623 | × | × | ○ | ○ |

○ : CURRENT IS APPLIED    × : NO CURRENT IS APPLIED

Fig.7B

| IC CHIP / SEPARATION STATE | ALL ARE CONNECTED | SEPARATED AT 625 | SEPARATED AT 626 | SEPARATED AT 625 AND 626 |
|---|---|---|---|---|
| 610 | ○ | × | × | × |
| 611 | × | × | ○ | × |
| 612 | × | ○ | × | ○ |
| 620 | × | ○ | × | × |
| 621 | × | × | × | ○ |
| 624 | × | × | ○ | ○ |

○ : ELECTRIC POWER IS SUPPLIED TO IC CHIP
× : NO ELECTRIC POWER IS SUPPLIED TO IC CHIP

Fig.8A
| INPUT (1, 2) | AND CIRCUIT OUTPUT | EXCLUSIVE OR CIRCUIT OUTPUT |
|---|---|---|
| (×, ×) | × | × |
| (×, ○) | × | ○ |
| (○, ×) | × | ○ |
| (○, ○) | ○ | × |
○ : CURRENT IS APPLIED
× : NO CURRENT IS APPLIED
Fig.8B
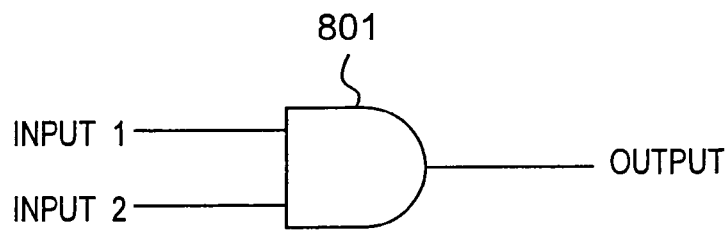
Fig.8C
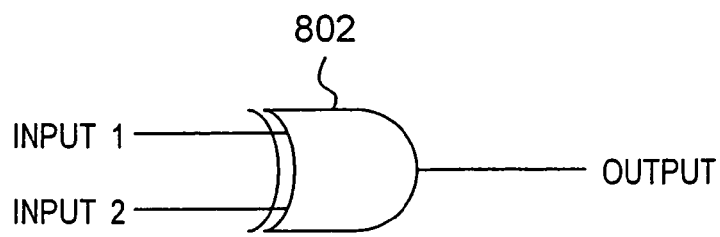

Fig.23

| CONNECTION/SEPARATION STATE AND TRANSMITTED INFORMATION | INFORMATION TRANSMITTED FROM TAG MAIN BODY | INFORMATION TRANSMITTED FROM TAG FRAGMENT | INFORMATION TRANSMITTED FROM DIFFERENT TAG FRAGMENT |
|---|---|---|---|
| TAG MAIN BODY (BACK PLATE) IS APPROPRIATELY CONNECTED TO TAG FRAGMENT (SIDE PLATE) IN SIDE PLATE INSERTION PORTION | SIDE PLATE IS NORMALLY ATTACHED | — | NOT ATTACHED TO BACK PLATE |
| NO COMPONENT IS INSERTED INTO SIDE PLATE INSERTION PORTION OF TAG MAIN BODY (BACK PLATE) | SIDE PLATE IS NOT ATTACHED | NOT ATTACHED TO BACK PLATE | NOT ATTACHED TO BACK PLATE |
| DIFFERENT TAG FRAGMENT (TOP PLATE) IS ERRONEOUSLY INSERTED INTO SIDE PLATE INSERTION PORTION OF TAG MAIN BODY (BACK PLATE) | DIFFERENT COMPONENT IS ATTACHED | NOT ATTACHED TO BACK PLATE | DIFFERENT COMPONENT IS ATTACHED |

Fig.24B

| CONNECTION/ SEPARATION STATE \ SELECTED IC CHIP | 2408 | 2409 | 2410 |
|---|---|---|---|
| NO TAG FRAGMENT IS CONNECTED | SIDE PLATE IS NOT ATTACHED | — | — |
| TAG FRAGMENT B2402 FOR TAG MAIN BODY A2401 IS CONNECTED | — | — | SIDE PLATE IS NORMALLY ATTACHED |
| TAG FRAGMENT C2403 FOR TAG MAIN BODY OTHER THAN TAG MAIN BODY A2401 IS CONNECTED | — | COMPONENT DIFFERENT FROM SIDE PLATE IS ATTACHED | |

| RECORDED INFORMATION ITEM | TAG ID | PRODUCT NUMBER | PRODUCT NAME | SIZE | COLOR | PRICE |
|---|---|---|---|---|---|---|
| INFORMATION VARIABILITY | | INVARIABLE INFORMATION | | | | VARIABLE INFORMATION |
| EACH INFORMATION TRANSMITTABLE STATE | DURING CONNECTION AND SEPARATION | DURING CONNECTION AND SEPARATION | DURING CONNECTION AND SEPARATION | DURING CONNECTION AND SEPARATION | DURING CONNECTION AND SEPARATION | DURING CONNECTION AND SEPARATION |

Fig.25B

401 → | RECORDED INFORMATION | TS001 | 073N3A96B | T-SHIRT | LL | WHITE | 14,800 YEN |

Fig.25C

| RECORDED INFORMATION ITEM | TAG ID | PRODUCT NUMBER | PRODUCT NAME | SIZE | COLOR | PRODUCT ADDRESS |
|---|---|---|---|---|---|---|
| INFORMATION VARIABILITY | | | INVARIABLE INFORMATION | | | |
| EACH INFORMATION TRANSMITTABLE STATE | DURING SEPARATION | DURING SEPARATION | DURING SEPARATION | DURING SEPARATION | DURING SEPARATION | DURING SEPARATION |

402 → | RECORDED INFORMATION | TS002 | 073N3A96B | T-SHIRT | LL | WHITE | http://www.O× |

| RECORDED INFORMATION ITEM | TAG ID | PRODUCT NUMBER | PRODUCT NAME | SIZE | COLOR | PRODUCT ADDRESS | NUMBER OF TIMES OF WASHING |
|---|---|---|---|---|---|---|---|
| INFORMATION VARIABILITY | INVARIABLE INFORMATION ||||||  VARIABLE INFORMATION |
| EACH INFORMATION TRANSMITTABLE STATE | STATES 2, 3, 4 | STATES 2, 3, 4 | STATES 2, 3, 4 | STATE 2 | STATES 2, 3, 4 | STATES 2, 3, 4 | STATE 2 |

Fig.26B

903 → | RECORDED INFORMATION | TS001 | 073N3A96B | T-SHIRT | LL | WHITE | http://www.O×△ | 14 TIMES |

Fig.26C

| RECORDED INFORMATION ITEM | TAG ID | PRODUCT NUMBER | ERROR CODE |
|---|---|---|---|
| INFORMATION VARIABILITY | | INVARIABLE INFORMATION | |
| EACH INFORMATION TRANSMITTABLE STATE | STATES 3, 4 | STATES 3, 4 | STATE 4 |

| RECORDED INFORMATION ITEM | TAG ID | PRODUCT NUMBER | PRODUCT NAME | SIZE | COLOR | PRODUCT ADDRESS | PRICE |
|---|---|---|---|---|---|---|---|
| INFORMATION VARIABILITY | | | INVARIABLE INFORMATION | | | | VARIABLE INFORMATION |
| EACH INFORMATION TRANSMITTABLE STATE | | | STATES 1, 2, 3 | | | | STATES 1, 2, 3 |

907 → | RECORDED INFORMATION | TS003 | 073N3A96B | T-SHIRT | LL | WHITE | 2004/11/22 | 14800 YEN |

Fig.29B

1005 RECORDED INFORMATION | TL001 | L320SA90 | LIGHT BULB | TYPE-9 | G5 BASE

| RECORDED INFORMATION ITEM | TAG ID | PRODUCT NUMBER | PRODUCT NAME | DIMENSION | SHAPE OF BASE | START TIME OF USE | TYPE NUMBER OF ILLUMINATOR |
|---|---|---|---|---|---|---|---|
| INFORMATION VARIABILITY | | INVARIABLE INFORMATION | | | | VARIABLE INFORMATION | |
| EACH INFORMATION TRANSMITTABLE STATE | | | STATES 2, 3, 4 | | | | |

Fig.29D

1008 → RECORDED INFORMATION | TL002 | L320SA90 | LIGHT BULB | TYPE-9 | G5 BASE | 2004/11/22 | A92G221

STATE RECOGNITION TAG

This is a continuation application of International Application No. PCT/JP2005/010063, filed Jun. 1, 2005.

BACKGROUND OF THE INVENTION

The present invention relates to a state recognition tag that changes information to be transmitted from a tag main body and a tag fragment to a tag reader/writer by recognizing from which position among one or more separation positions located on the tag main body the tag fragment is separated.

At present, IC tags are expected to replace barcodes as a new technique and to be allocated to all articles in place of the barcodes in the future. Information recorded on a tag allocated to an article is considered to include a name, an ID, a price, and an expiration date of the article as well as product information on the article. Articles are not left always in constant states and some articles are separated or combined. In this case, information transmitted from each tag is desirably information suited for a present state of each article such as information on each part of an article when the article is separated into article parts or information on an integrated article when the article parts are combined.

Meanwhile, Patent Document 1 (Japanese Unexamined Patent Publication No. 2002-362613) discloses a technique using a capacitive coupling IC chip. As means for the technique, the capacitive coupling noncontact IC chip capable of transmitting and receiving information with an external apparatus is stacked over conductive layers, which is formed on a packaged base material, constituted as two antenna units independent to each other without any contact portions by cutting and separating the material.

Patent Document 2 (Japanese Laid-Open Patent Publication No. 10-039758) discloses a technique using a resonant tag. As means for the technique, by providing a coil unit, a capacitor unit, or a break for cutting is formed between the coil unit and the capacitor unit, a frequency is changed to one in a preset frequency band or a resonant phenomenon can be prevented.

Patent Document 3 (Japanese Laid-Open Patent Publication No. 2002-60012) discloses the following technique. When a slip is cut and separated from an article transport slip attached to an article, a part of a conductive pattern is disconnected and electric characteristics changes. Then, a slip detecting unit transmits detection information to a control unit so as to stop using an ID code "54321".

Patent Document 4 (Japanese Laid-Open Patent Publication No. 2003-123046) discloses the following technique. A client card is configured to include a parent card and one or more child cards separably connected to one another. Non-contact IC tags are mounted on the parent card and the child cards, respectively and store therein the same recognition code.

DISCLOSURE OF INVENTION

Issues to be Solved by the Invention

However, according to the Patent Document 1, the IC chip does not start functioning as a tag until the packaged base material is cut off and unpackaged. Namely, the IC chip does not function as the tag before unpackaging.

According to the Patent Document 2, only the frequency may be changed by cutting out the tag and information transmitted from the tag cannot be changed before and after cutting out the tag. Furthermore, the tag fragment thus cut out does not necessarily function as a tag.

In addition, the technique according to the Patent Document 3 does not include the tag.

Moreover, according to the Patent Document 4, each tag cannot recognize the cutting and separation. Even in view of the other documents, information on each tag may not be changed by cutting and separation. Therefore, a cut and separation state cannot be detected.

It is, therefore, an object of the present invention to provide a state recognition tag that can solve the issues, that can recognize a separation state between a tag main body and a tag fragment, and that can change information transmitted from the tag man body and the tag fragment to a tag reader/writer.

Means to Solve the Issues

To attain the above object, the present invention is configured as follows.

According to a first aspect of the present invention, there is provided a state recognition tag comprising:

a tag main body recognizable by a tag reader/writer;

a tag fragment separable from the tag main body and recognizable by the tag reader/writer;

a tag-main-body information holding unit that is provided in the tag main body, for storing information to be transmitted to the tag reader/writer for recognizing the tag main body;

a tag-fragment information holding unit that is provided in the tag fragment, for storing information to be transmitted to the tag reader/writer for recognizing the tag fragment;

a tag-main-body separation-state recognizing unit that is provided in the tag main body, for recognizing a separation state of the tag main body and the tag fragment;

a tag-fragment separation-state recognizing unit that is provided in the tag fragment, for recognizing the separation state of the tag main body and the tag fragment;

a tag-main-body control unit that is provided in the tag main body, for selecting the information held by the tag-main-body information holding unit, by determining whether the tag main body is separated from or connected with the tag fragment based on the separation state recognized by the tag-main-body separation-state recognizing unit, and for transmitting, rewriting, or adding the information selected based on the information from the tag reader/writer;

a tag-fragment control unit that is provided in the tag fragment, for selecting the information held by the tag-fragment information holding unit, by determining whether the tag main body is separated from or connected with the tag fragment based on the separation state recognized by the tag-fragment separation-state recognizing unit, and for transmitting, rewriting, or adding the information selected based on the information from the tag reader/writer;

a tag-main-body electric power supplying unit that is provided in the tag main body, for supplying electric power to the tag-main-body information holding unit, the tag-main-body separation-state recognizing unit, and the tag-main-body control unit; and a tag-fragment electric power supplying unit that is provided in the tag fragment, for supplying electric power to the tag-fragment information holding unit, the tag-fragment separation-state recognizing unit, and the tag-fragment control unit.

Effects Due to the Invention

As above, the state recognition tag according to the present invention includes: a tag main body; a tag fragment separable from the tag main body; a tag-main-body information holding unit for storing information to be transmitted; a tag-fragment information holding unit; a tag-main-body separation-state recognizing unit for recognizing a separation state of the tag main body and the tag fragment; a tag-fragment separation-state recognizing unit; a tag-main-body control unit for transmitting, rewriting, or adding the information selected based on the separation state; a tag-fragment control unit for transmitting, rewriting, or adding the information selected based on the information based on the separation state; a tag-main-body electric power supplying unit for supplying electric power to the tag-main-body information holding unit, the tag-main-body separation-state recognizing unit, and the tag-main-body control unit; and a tag-fragment electric power supplying unit for supplying electric power to the tag-fragment information holding unit, the tag-fragment separation-state recognizing unit, and the tag-fragment control unit. Therefore, whether the tag main body is separated from or connected to the tag fragment, it is possible to cause both the tag main body and the tag fragment to function as tags if it is necessary to do so. Moreover, different information can be provided to a user according to the separation state between the tag main body and the tag fragment.

BRIEF DESCRIPTION OF DRAWINGS

These and other aspects and features of the present invention will become clear from the following description taken in conjunction with the preferred embodiments thereof with reference to the accompanying drawings, in which:

FIG. 5 is a circuit-specific current input/output table of the state recognition tag shown in FIG. 3;

FIG. 7A is a circuit-specific current input/output table of the state recognition tag shown in FIG. 6;

FIG. 7B is a circuit-specific current input/output table of the state recognition tag shown in FIG. 6;

FIG. 8A is a circuit-specific current input/output table of the state recognition tags according to the first and second embodiments;

FIG. 8B is a circuit-specific current input/output table of the state recognition tags according to the first and second embodiments;

FIG. 8C is a circuit-specific current input/output table of the state recognition tags according to the first and second embodiments;

FIG. 23 is a view showing an example in which information to be transmitted in the state recognition tag according to the fourth embodiment of the present invention differs according to the separation state of the tag fragment with respect to a tag main body attached to a side-plate insertion portion of a back plate;

FIG. 24B is a view showing an example of information of the state recognition tag according to the fourth embodiment of the present invention based on the example of the configuration shown in FIG. 24A for realizing the transmission of information shown in FIG. 23;

FIG. 25A is a view showing an example of information of the tag main body in a case where the state recognition tag according to the first embodiment is used as a price tag of an article;

FIG. 25B is a view showing an example of information held by the tag main body in a case where the state recognition tag according to the first embodiment is used as the price tag of the article;

FIG. 25C is a view showing an example of information of the tag fragment in a case where the state recognition tag according to the first embodiment is used as a price tag of an article;

FIG. 25D is a view showing an example of information held by the tag fragment in a case where the state recognition tag according to the first embodiment is used as the price tag of the article;

FIG. 26A is a view showing an example of information of the tag main body in a case where the state recognition tag according to the second embodiment is used for a clothing shown in FIG. 9;

FIG. 26B is a view showing an example of information held by the tag main body in a case where the state recognition tag according to the second embodiment is used for the clothing shown in FIG. 9;

FIG. 26C is a view showing an example of information of the first tag fragment in a case where the state recognition tag according to the second embodiment is used for the clothing shown in FIG. 9;

FIG. 26E is a view showing an example of information of the second tag fragment in a case where the state recognition tag according to the second embodiment is used for the clothing shown in FIG. 9;

FIG. 26F is a view showing an example of information held by the second tag fragment in a case where the state recognition tag according to the second embodiment is used for the clothing shown in FIG. 9;

FIG. 29B is a view showing an example of information held by the tag main body of the state recognition tag when the state recognition tag is used for the light bulb shown in FIG. 10;

FIG. 29D is a view showing an example of information held by the second tag fragment of the state recognition tag when the state recognition tag is used for the light bulb shown in FIG. 10;

BEST MODE FOR CARRYING OUT THE INVENTION

Figure 1:
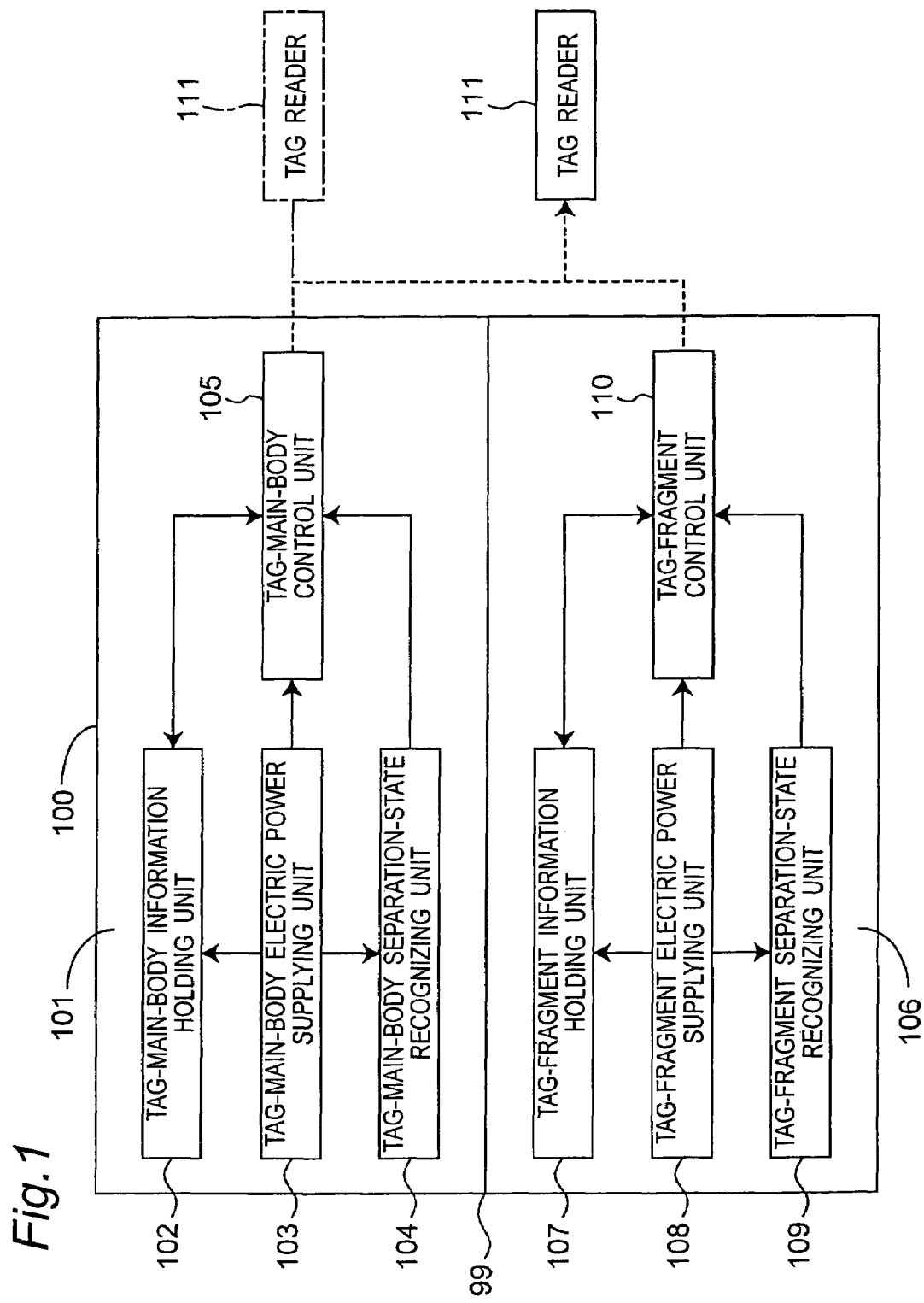
FIG. 1 is a block diagram of a state recognition system using a state recognition tag according to a first embodiment of the present invention.

Before the description of the present invention proceeds, it is to be noted that like parts are designated by like reference numerals throughout the accompanying drawings.

Before describing embodiments of the present invention with reference to the drawings, various aspects of the present invention will be described.

According to a first aspect of the present invention, there is provided a state recognition tag comprising:

a tag main body recognizable by a tag reader/writer;

a tag fragment separable from the tag main body and recognizable by the tag reader/writer;

a tag-main-body information holding unit that is provided in the tag main body, for storing information to be transmitted to the tag reader/writer for recognizing the tag main body;

a tag-fragment information holding unit that is provided in the tag fragment, for storing information to be transmitted to the tag reader/writer for recognizing the tag fragment;

a tag-main-body separation-state recognizing unit that is provided in the tag main body, for recognizing a separation state of the tag main body and the tag fragment;

a tag-fragment separation-state recognizing unit that is provided in the tag fragment, for recognizing the separation state of the tag main body and the tag fragment;

a tag-main-body control unit that is provided in the tag main body, for selecting the information held by the tag-main-body information holding unit, by determining whether the tag main body is separated from or connected with the tag fragment based on the separation state recognized by the tag-main-body separation-state recognizing unit, and for transmitting, rewriting, or adding the information selected based on the information from the tag reader/writer;

a tag-fragment control unit that is provided in the tag fragment, for selecting the information held by the tag-fragment information holding unit, by determining whether the tag main body is separated from or connected with the tag fragment based on the separation state recognized by the tag-fragment separation-state recognizing unit, and for transmitting, rewriting, or adding the information selected based on the information from the tag reader/writer;

a tag-main-body electric power supplying unit that is provided in the tag main body, for supplying electric power to the tag-main-body information holding unit, the tag-main-body separation-state recognizing unit, and the tag-main-body control unit; and a tag-fragment electric power supplying unit that is provided in the tag fragment, for supplying electric power to the tag-fragment information holding unit, the tag-fragment separation-state recognizing unit, and the tag-fragment control unit.

The tag reader/writer that can recognize the tag main body and the tag reader/writer that can recognize the tag fragment may be the same as or different from each other.

With the constitution, regardless of whether the tag main body is separated from or connected to the tag fragment, it is possible to cause both the tag main body and the tag fragment to function as tags as needed. Moreover, different information can be provided to a user according to the separation state between the tag main body and the tag fragment.

According to a second aspect of the present invention, there is provided the state recognition tag according to the first aspect, wherein at least one additional tag fragment that include similar functions to functions of the tag fragment is separably connectable to the tag main body or the tag fragment, the separation-state recognizing unit of one of the tag main body, the tag fragment, and the at least one additional tag fragment recognizes the separation state of the tag fragment and the tag main body and a separation state of the at least one additional tag fragment and the tag main body, and the control unit selects the information to be transmitted to the tag reader/writer from the information holding unit according to the separation state recognized by one of the separation-state recognizing units, determines whether to transmit the information, and exercises a transmission control to transmit the information selected from the information holding unit to the tag reader/writer when the control unit determines to transmit the selected information.

It is preferable that the additional tag fragment separably connected to the tag main body or the tag fragment can be further connected to the other additional tag fragment.

With the constitution, the separation position can be provided at an arbitrary location. In addition, it is possible to set presence/absence of functions as a tag, change of information, and the like in more detail to correspond to the separation positions of the tag fragments, a combination of the tag fragments, the number of tag fragments, and the like.

According to a third aspect of the present invention, there is provided the state recognition tag according to the first or second aspect, wherein a break at which the tag main body and the tag fragment are separable from each other is provided in a portion in which the tag main body is separated from the tag fragment or a portion in which the tag fragment is separated from the additional tag fragment.

With the constitution, when the user separates the tag according to the present invention, it is possible to prevent the tag from being separated at a position which a tag manufacturer does not intend to separate the tag. In addition it is unnecessary for the user to be conscious of the separation position of the tag.

According to a fourth aspect of the present invention, there is provided the state recognition tag according to any one of the first to third aspects each having an engagement structure that includes a first engagement unit and a second engagement unit is provided in a portion in which the tag main body is separated from the tag fragment or a portion in which the tag fragment is separated from the additional tag fragment, the first engagement unit including one of the portions (one of the tag main body and the tag fragment), the second engagement unit being separably engageable with the first engagement unit, reconnectable after separation, and including the other portion (one of the tag fragment and the additional tag fragment).

With the constitution, the user of the present invention can switch over data according to not only opening of the product but also opening/closing of various containers or doors and attachment/detachment of a plug. In addition, the tag main body and the tag fragment can be manufactured separately and connected to each other afterwards.

According to a fifth aspect of the present invention, there is provided a container comprising:

a container main body in which one of the tag main body and the tag fragment of the state recognition tag according to any one of the first to fourth aspects is arranged; and a cap that is separably connected to the container main body and in which the other one of the tag main body and the tag fragment is arranged, wherein when the cap is connected to the container main body, the tag main body is connected to the tag fragment, and when the cap is separated from the container main body, the tag main body is separated from the tag fragment.

With the constitution, the opening/closing state of the container can be recognized, and it is possible to strictly manage the article and the expiration date of the article.

Embodiments of the present invention will be described hereinafter with reference to the drawings.

FIRST EMBODIMENT

FIG. 1 is a block diagram of a state recognition system using a state recognition tag according to a first embodiment of the present invention.

Here, the state recognition system includes a state recognition tag 100 recognizable by a tag reader/writer 111 and the tag reader/writer 111 for acquiring information from the state recognition tag 100. The state recognition tag 100 includes a tag main body 101 recognizable by the tag reader/writer 111 and a tag fragment 106 separable from the tag main body 101 at a separation position 99 and recognizable by the tag reader/writer 111.

The tag main body 101 includes a tag-main-body information holding unit 102, a tag-main-body electric power supplying unit 103, a tag-main-body separation-state recognizing unit 104, and a tag-main-body control unit 105. The tag-main-body control unit 105 transmits information recorded in the tag-main-body information holding unit 102 to the tag reader/writer 111.

The tag-main-body information holding unit 102 stores therein the information to be transmitted, and corresponds to, for example, an IC chip. Either preset invariable information is recorded in the tag-main-body information holding unit 102 or information can be added to the information held by the tag-main-body information holding unit 102 or the information held by the tag-main-body information holding unit 102 is changed by a tag writer or the like depending on situations.

The tag-main-body electric power supplying unit 103, which corresponds to, for example, a coil antenna, can supply electric power to the tag-main-body information holding unit 102, the tag-main-body separation-state recognizing unit 104, and the tag-main-body control unit 105.

The tag-main-body separation-state recognizing unit 104 recognizes a separation state of the tag main body 101 and the tag fragment 106. Specifically, the tag-main-body separation-state recognizing unit 104 recognizes whether the tag fragment 106 is separated from the tag main body 101 at the separation position 99, and transmits information on a recognition result to the tag-main-body control unit 105.

The tag-main-body control unit 105 determines whether to select and transmit the information held by the tag-main-body information holding unit 102 by determining whether the tag main body 101 is separated from or connected to the tag fragment 106 based on the separation state recognized by the tag-main-body separation-state recognizing unit 104. Specifically, if the tag main body 101 is separated from the tag fragment 106 and the information held by the tag-main-body information holding unit 102 is transmitted, the tag-main-body control unit 105 exercises transmission control for transmitting the selected information (information corresponding to the separation) from the tag-main-body information holding unit 102 to the tag reader/writer 111. Conversely, if the tag main body 101 and the tag fragment 106 are not separated from each other but connected to each other and the information held by the tag-main-body information holding unit 102 is transmitted, the tag-main-body control unit 105 may exercise transmission control for transmitting the selected information (information corresponding to the connection) from the tag-main-body information holding unit 102 to the tag reader/writer 111.

The tag fragment 106 includes a tag-fragment information holding unit 107, a tag-fragment electric power supplying unit 108, a tag-fragment separation-state recognizing unit 109, and tag-fragment control unit 110. The tag-fragment control unit 110 transmits information recorded in the tag-fragment information holding unit 107 to the tag reader/writer 111.

The tag-fragment information holding unit 107 stores therein the information to be transmitted and corresponds to, for example, an IC chip. Either preset invariable information is recorded in the tag-fragment information holding unit 107 or information can be added to the information held by the tag-fragment information holding unit 107 or the information held by the tag-fragment information holding unit 107 is changed in the tag-fragment information holding unit 107 by the tag writer or the like depending on situations.

The tag-fragment electric power supplying unit 108, which corresponds to, for example, a coil antenna, can supply electric power to the tag-fragment information holding unit 107, the tag-fragment separation-state recognizing unit 109, and the tag-fragment control unit 110.

The tag-fragment separation-state recognizing unit 109 recognizes a separation state of the tag main body 101 and the tag fragment 106. Specifically, the tag-fragment separation-state recognizing unit 109 recognizes whether the tag fragment 106 is separated from the tag main body 101 at the separation position 99, and transmits information on a recognition result to the tag-fragment control unit 110.

The tag-fragment control unit 110 determines whether to select and transmit the information held by the tag-fragment information holding unit 107 by determining whether the tag main body 101 is separated from or connected to the tag fragment 106 based on the separation state recognized by the tag-fragment separation-state recognizing unit 109. Specifically, if the tag main body 101 is separated from the tag fragment 106 and the information held by the tag-fragment information holding unit 107 is transmitted, the tag-fragment control unit 110 exercises transmission control for transmitting the selected information (information corresponding to the separation) from the tag-fragment information holding unit 107 to the tag reader/writer 111. Conversely, if the tag main body 101 and the tag fragment 106 are not separated from each other but connected to each other and the information held by the tag-fragment information holding unit 107 is transmitted, the tag-fragment control unit 110 may exercise transmission control for transmitting the selected information (information corresponding to the connection) from the tag-fragment information holding unit 107 to the tag reader/writer 111.

The tag reader/writer 111 to Which the tag-main-body control unit 105 transmits the information may be either the same as or different from the tag reader/writer 111 to which the tag-fragment control unit 110 transmits the information.

Figure 2:
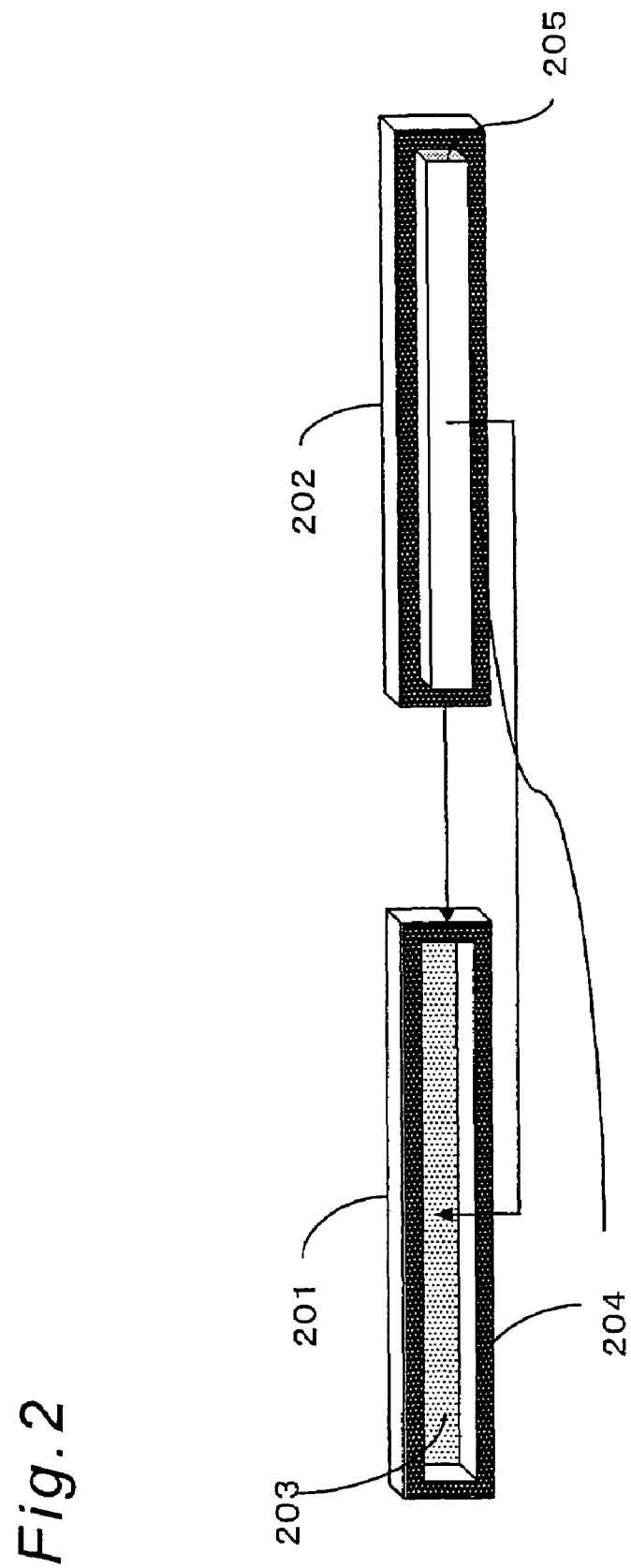
FIG. 2 is a perspective view of an example of the state recognition tag using a contact sensor in the state recognition tag shown in FIG. 1.

Referring to FIGS. 1 and 2, a method of causing a contact sensor 203, which is an example of the tag-main-body separation-state recognizing unit 104 and the tag-fragment separation-state recognizing unit 109, to recognize the separation state of the tag main body 101 and the tag fragment 106 will be described.

A tag main body 201 corresponding to the tag main body 101 is constructed by a rectangular parallelepiped box, and includes the contact sensor 203 and a first adhesive material 204. The contact sensor 203 is arranged on a bottom of a rectangular opening of the box, and the first adhesive material 204 is arranged around the opening of the box and consists of an adhesive material. A tag fragment 202 corresponding to the tag fragment 106 is a cap of the box, and includes a second adhesive material 204 and a rectangular parallelepiped protrusion 205. The second adhesive material 204 is arranged around the cap corresponding to surroundings of the opening of the box, and consists of an adhesive material that can separably adhere to the first adhesive material 204. The protrusion 205 can be fitted into the opening of the box.

When the tag main body 201 and the tag fragment 202 are connected to each other by the first and second adhesive materials 204, the protrusion 205 of the tag fragment 202 is fitted into the opening of the box, contacts with the contact sensor 203 of the tag main body 201, and causes the contact sensor 203 to produce a contact reaction and to output a contact signal.

If so, the output contact signal, that is, information indicating that the tag main body 201 is connected to the tag fragment 202 is transmitted from the contact sensor 203 that functions as the tag-main-body separation-state recognizing unit 104 to the tag-main-body control unit 105. The tag-main-body control unit 105 wirelessly transmits information necessary when the tag main body 201 is connected to the tag fragment 202 from the tag-main-body information holding unit 102 to the tag reader/writer 111.

When the tag main body 201 is not connected to the tag fragment 202 by the first and second adhesive materials 204, that is, the protrusion 205 of the tag fragment 202 is not fitted into the opening of the box of the tag main body 201, the protrusion 205 does not contact with the contact sensor 203. Thus, the contact sensor 203 does not produce the contact reaction and outputs not the contact signal but a noncontact signal.

If so, the contact sensor 203 that functions as the tag-main-body separation-state recognizing unit 104 transmits the output noncontact signal, that is, information indicating that the tag main body 201 is separated from the tag fragment 202 to the tag-main-body control unit 105. The tag-main-body control unit 105 wirelessly transmits information necessary when the tag main body 201 is separated from the tag fragment 202 from the tag-main-body information holding unit 102 to the tag reader/writer 111.

It is to be noted that a configuration of the tag-main-body separation-state recognizing unit 104 (or the tag-fragment separation-state recognizing unit 109) shown in FIG. 2 is an example, and that the present invention can be realized by the other configuration.

Figures 3, 4:
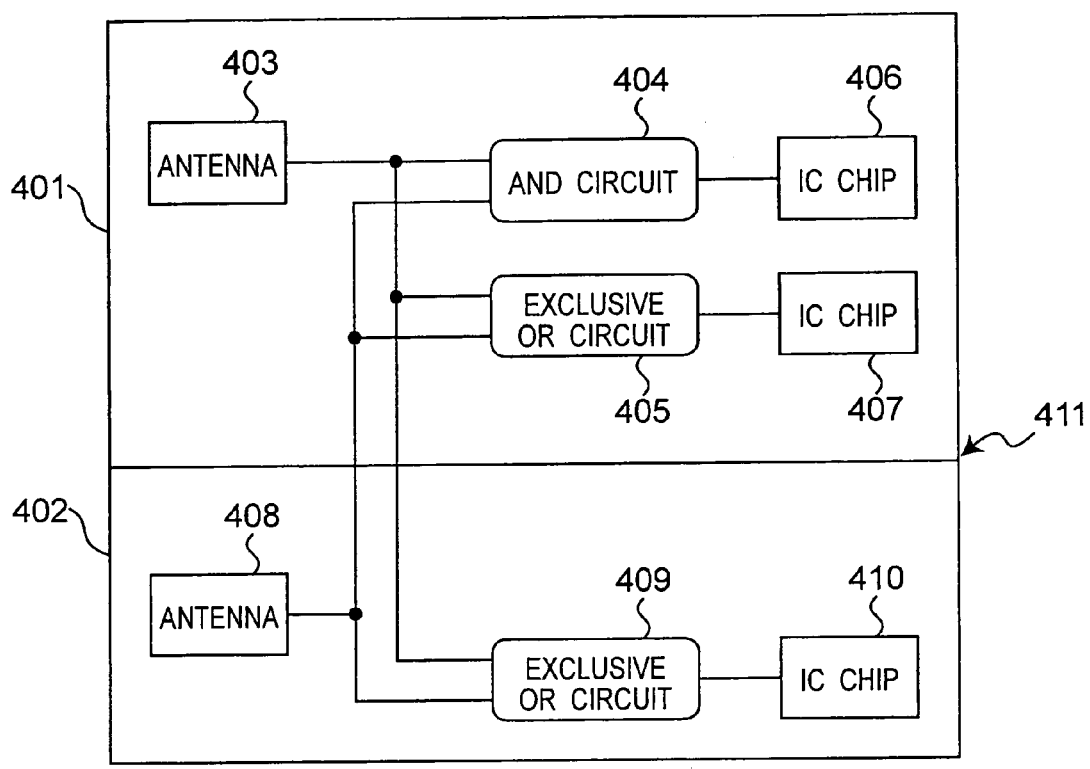
FIG. 3 is a view showing an example of a configuration of the state recognition tag according to the first embodiment of the present invention.
FIG. 4 is a circuit-specific current input/output table of the state recognition tag shown in FIG. 3.

Referring next to FIG. 3, an example of a configuration of the state recognition tag according to the first embodiment of the present invention will be described. FIGS. 4 and 5 show whether a current is applied to each logic circuit and whether electric power is supplied to each IC chip depending on the separation state of the state recognition tag.

In the first embodiment, the state recognition tag includes a tag main body 401, a tag fragment 402, antennas 403 and 408, an AND circuit 404, exclusive OR circuits 405 and 409, information holding circuits 102 and 107, IC chips 406, 407, and 410 that are an example of units for transmitting, rewriting, or adding (transmitting/or rewriting and adding) information based on the information from the tag reader/writer of the control unit (hereinafter, "IC chips"), and a separation position 411 (corresponding to the separation position 99) between the tag main body 401 is separated from the tag fragment 402. The tag main body 401 corresponds to the tag main body 101. The tag fragment 402 corresponds to the tag fragment 106. The antennas 403 and 408 function as the tag-main-body electric power supplying unit 103 and the tag-fragment electric power supplying unit 108, and supply electric power, respectively. The AND circuit 404 selects information from the information holding unit of the control unit. The electric power is supplied through conductors. The AND circuit 404 and the exclusive OR circuit 405 function as the tag-main-body separation-state recognizing unit 104. The exclusive OR circuit 409 functions as the tag-fragment separation-state recognizing unit 109. The IC chips 406 and 407 function as the tag-main-body information holding unit 102. The IC chip 410 functions as the tag-fragment information holding unit 107.

The tag-main-body control unit 105 is represented by the respective constituent elements 404 to 407, which are the example of the units for selecting information from the information holding unit, and the IC chips, which are the example of the units for transmitting/or rewriting and adding information based on a wiring (connection) pattern in the tag main body shown in FIG. 3 and the information from the tag reader-writer.

The tag-fragment control unit 110 is represented by the respective constituent elements 409 and 410, which are the example of the units for selecting information from the information holding unit, and the IC chips, which are the example of the units for transmitting/or rewriting and adding information based on a wiring (connection) pattern in the tag fragment shown in FIG. 3 and the information from the tag reader-writer.

The IC chip 406 records therein information to be transmitted to the tag reader/writer (e.g., tag reader/writer 107 shown in FIG. 1) before the tag fragment 402 is separated from the tag main body 401 at the separation position 411. The IC chips 407 and 410 record therein information to be transmitted to the tag reader/writer after the tag fragment 402 is separated from the tag main body 401 at the separation position 411.

In the tag main body 401, before the tag fragment 402 is separated from the tag main body 401 at the separation position 411, the electric power is supplied from both the antennas 403 and 408. Accordingly, the electric power is supplied to the IC chip 406 through the AND circuit 404 but no electric power is supplied to the IC chip 407 through the exclusive OR circuit 405 (see a lowermost column of a circuit-specific electric power input/output table shown in FIG. 8A and tables of FIGS. 4 and 5).

In the tag main body 401, after the tag fragment 402 is separated from the tag main body 401 at the separation position 411, the electric power is supplied only from the antenna 403. Accordingly, the electric power is supplied to the IC chip 407 through the exclusive OR circuit 405 but no electric power is supplied to the IC chip 406 through the AND circuit 404 (see a second column from the bottom of the circuit-specific electric power input/output table shown in FIG. 8A and the tables shown in FIGS. 4 and 5).

In the tag fragment 402, before the tag fragment 402 is separated from the tag main body 401 at the separation position 411, the electric power is supplied from the both antennas 403 and 408. Accordingly, no electric power is supplied to the IC chip 410 through the exclusive OR circuit 409 (see the lowest column of the circuit-specific electric power input/output table shown in FIG. 8A and the tables shown in FIGS. 4 and 5).

In the tag fragment 402, after the tag fragment 402 is separated from the tag main body 401 at the separation position 411, the electric power is supplied only from the antenna 408. Accordingly, the electric power is supplied to the IC chip 410 through the exclusive OR circuit 409 (see a third column from the bottom of the circuit-specific electric power input/output table shown in FIG. 8A and the tables shown in FIGS. 4 and 5).

With the configuration, when the tag main body 401 is connected to the tag fragment 402, the information of the IC chip 406 in the tag main body is transmitted to the tag reader/writer but no information is transmitted from the tag fragment 402 to the tag reader/writer. When the tag main body 401 is separated from the tag fragment 402, the information of the IC chip 407 in the tag main body 401 and the information of the IC chip 410 in the tag fragment 402 are transmitted to the tag reader/writer.

Alternatively, by changing (or adding) a combination of circuits, the state recognition tag can be configured as follows. Information is not transmitted from both the tag main body 401 and the tag fragment 402 when the tag main body 401 is connected to the tag fragment 402. Furthermore, information is transmitted from both the tag main body 401 and the tag fragment 402 only when the tag main body 401 is separated from the tag fragment 402.

Such a system can be applied to, for example, a price tag of a product. At present, an IC tag is often used as the price tag to reduce operation such as clerks' stocktaking. However, if the first embodiment is used, only shop information can be transmitted to the tag reader/writer (e.g., the tag reader/writer 111 shown in FIG. 1) when the tag main body 401 is not separated from the tag fragment 402. When a client buys the product, the tag main body 401 is separated from the tag fragment 402. In addition, only the tag fragment 402 which newly functions as a tag and in which client information is recorded can be passed to the client. The client can thereby know more detailed product information from the tag fragment 402 received by the client. Furthermore, a purchase date may be recorded in the tag main body 401 and the tag fragment 402 separated from each other, by using the tag writer.

FIGS. 25A to 25D show an example of the information recorded in the tag main body 401 and the tag fragment 402.

Recorded information items shown in FIGS. 25A and 25C are items of information recorded in the tag. Information such as a tag ID, a product number, a product name, a size, a color, and a price is recorded in the IC chips 406 and 407 that serve as the tag-main-body information holding unit 102 of the tag main body 401. Likewise, information such as the tag ID, the product number, the product name, the size, the color, and a product address is recorded in the IC chip 410 that serves as the tag-fragment information holding unit 107 of the tag fragment 402.

In FIGS. 25A and 25C, information variability indicates whether the information recorded in the tag can be rewritten. In the tag main body 401, the price information recorded in the IC chips 406 and 407 can be rewritable; however, the other information such as the tag ID, the product number, the product name, the size, and the color cannot be rewritten. In the tag fragment 402, all the information such as the tag ID, the product number, the product name, the size, the color, and the product address cannot be rewritten.

In FIGS. 25A and 25C, "each information transmittable state" indicates each state (separation state or connection state) shown in FIGS. 27A to 27D in which state the information on the recorded information items can be transmitted from the tag main body 401 and the tag fragment 402.

In FIGS. 25B and 25D, examples of the held information are those of information recorded in the tag main body 401 and the tag fragment 402, respectively.

According to the first embodiment, each of the tag main body 401 and the tag fragment 402 includes the electric power supplying unit and the information holding unit. Therefore, even if the tag fragment 402 is separated from the tag main body 401, not only the tag main body 401 but also the tag fragment 402 separated from the tag main body 401 can function as a tag. Moreover, presence or absence of the tag function, change of information and the like can be freely set during both connection and separation.

SECOND EMBODIMENT

Figure 6:
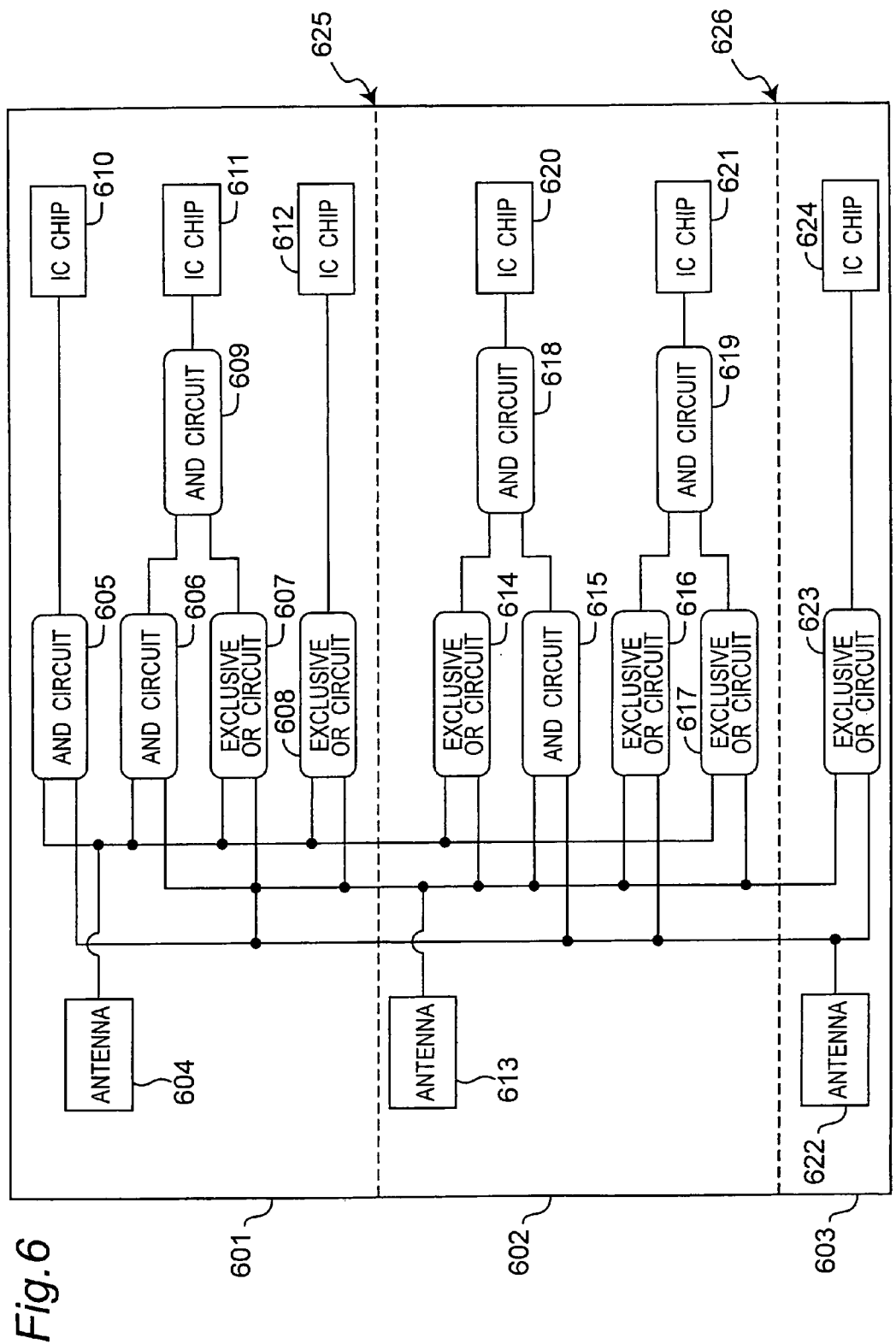
FIG. 6 is a view showing an example of a configuration of a state recognition tag according to a second embodiment of the present invention.

FIG. 6 is a view showing a configuration example of a state recognition tag 600 according to a second embodiment of the present invention, which tag includes a plurality of tag fragments, i.e., a tag fragment 602 and a second tag fragment 603 (which is an example of an additional tag fragment and which may function similarly to the tag fragments 602 if it is necessary to do so). FIG. 7A shows whether a current is applied to each logic circuit and whether electric power is supplied to each IC chip depending on a separation state of the state recognition tag.

In the second embodiment, the tag recognition tag 600 includes a tag main body 601, the first tag fragment 602, the second tag fragment 603, an antenna 604, antennas 613 and 622, AND circuits 605, 606, 609, 615, 618, and 619, exclusive OR circuits 607, 608, 614, 616, 617, and 623, an information holding unit, IC chips 610, 611, 612, 620, 621, and 624 that are an example of units for transmitting/or rewriting and adding information based on information from a tag reader/writer of the control unit (hereinafter, "IC chips"), a separation position 625, and a separation position 626. The antenna 604 functions as a tag-main-body electric power supplying unit and supplies electric power. The antennas 613 and 622 function as tag-fragment electric power supplying units and supply electric power. The AND circuits 605, 606, 609, 615, 618, and 619 are units for selecting information from the information holding unit of the control unit. The separation position 625 is a position at which the tag main body 601 is separated from the first tag fragment 602. The separation position 626 is a position at which the tag main body 602 is separated from the second tag fragment 603. The electric power is supplied through conductors. The AND circuits 605 and 606, the exclusive OR circuits 607 and 608, and the AND circuit 609 function as a tag-main-body separation-state recognizing unit. The exclusive OR circuits 614, 616, and 617 and the AND circuits 615, 618, and 619 function as a separation-state recognizing unit for the first tag segment 602. The exclusive OR circuit 623 functions as a separation-state recognizing unit for the second tag segment 603. The IC chips 610, 611, and 612 function as a tag-main-body information holding unit. The IC chips 620 and 621 function as an information holding unit for the first tag segment 602. The IC chip 624 functions as an information holding unit for the second tag segment 603.

The tag-main-body control unit is represented by the respective constituent elements 605 to 612, which are examples of units for selecting information from the information holding unit, and the IC chips, which are examples of units for transmitting/or rewriting and adding information based on wiring (connection) patterns in the tag main body shown in FIG. 6 and the information from the tag reader-writer.

The tag-fragment control unit is represented by the respective constituent elements 614 to 621, which are examples of units for selecting information from the information holding unit, and the IC chips, which are examples of units for transmitting/or rewriting and adding information based on wiring (connection) patterns in the tag fragment shown in FIG. 6 and the information from the tag reader-writer.

The additional tag-fragment control unit is represented by the respective constituent elements 623 and 624, which are examples of units for selecting information from the information holding unit, and the IC chip, which is an example of unit for transmitting/or rewriting and adding information based on wiring (connection) patterns in the additional tag fragment shown in FIG. 6 and the information from the tag reader-writer.

Conductors are connected from the antenna 622 to the respective circuits 605, 607, 615, 616, and 623. Conductors are connected from the antenna 604 to the respective circuits 605, 606, 607, 608, 614, and 617. Conductors are connected from the antenna 613 to the respective circuits 606, 608, 614, 615, 616, 617, and 623.

The IC chip 610 records therein information to be transmitted to the tag reader/writer (e.g., the tag reader/writer 111 shown in FIG. 1) when the tag main body 601 and the first and second tag fragments 602 and 603 are connected to each other.

The IC chip 611 records therein information to be transmitted to the tag reader/writer when only the second tag fragment 603 is separated at the separation position 626 from the first tag fragment 602 connected to the tag main body 601.

The IC chip 624 records therein information to be transmitted to the tag reader/writer when the second tag fragment 603 is separated at the separation position 626 from the first tag segment 602 connected to the tag main body 601.

The IC chip 612 records therein information to be transmitted to the tag reader/writer when the first tag segment 602 from which the second tag segment 603 is separated or the first tag segment 602 to which the second tag fragment 603 is connected is separated from the tag main body 601 at the separation position 625.

The IC chip 620 records therein information to be transmitted to the tag reader/writer when the first tag fragment 602 is separated from the tag main body 601 at the separation position 625 while the second tag fragment 603 is connected to the first tag fragment 602.

The IC chip 621 records therein information to be transmitted to the tag reader/writer when the first tag fragment 602 is respectively separated from the tag main body 601 and the second tag fragment 603 at the respective separation positions 625 and 626.

Operations performed by the state recognition tag according to the second embodiment will be described with reference to the flowcharts of FIGS. 28A to 28D for the operations performed by the state recognition tag in respective states based on the configuration of FIG. 6.

Figure 27A:
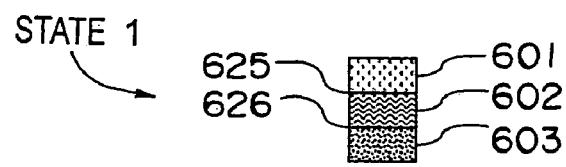
FIG. 27A is a view showing a tag in a "state 1" in which the tag main body is connected to the first tag fragment, and in which the first tag fragment is connected to the second tag fragment.

As shown in FIG. 27A, a "state 1" indicates the tag in which the tag main body 601 is connected to the first tag fragment 602 and in which the first tag fragment 602 is connected to the second tag fragment 603.

Figure 27B:
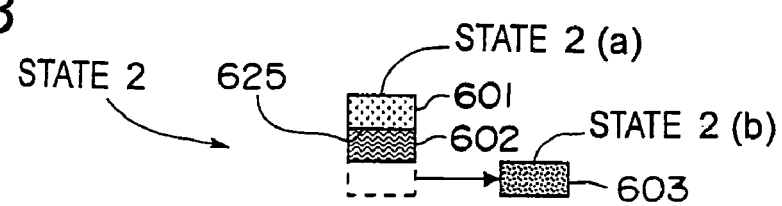
FIG. 27B is a view showing a tag in a "state 2" in which the tag main body is connected to the first tag fragment, and in which the first tag fragment is separated from the second tag fragment.

As shown in FIG. 27B, a "state 2(*a*)" indicates the tag in which the tag main body 601 is connected to the first tag segment 602 in a "state 2". In addition, a "state 2(*b*)" indicates the second tag fragment 603 separated from the first tag fragment 602 in the "state 2".

Figure 27C:
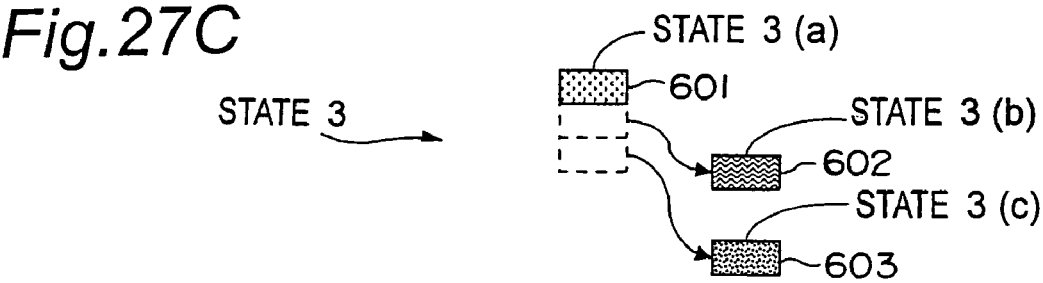
FIG. 27C is a view showing a tag in a "state 3" in which the tag main body is separated from the first tag fragment, and in which the first tag fragment is separated from the second tag fragment.

As shown in FIG. 27C, a "state 3(*a*)" indicates the tag main body 601 in a "state 3". A "state 3(*b*)" indicates the first tag fragment 602 separated from the tag main body 601 in the "state 3", and a "state 3(*c*)" indicates the second tag fragment 603 separated from the first tag fragment 602 in the "state 3".

Figure 27D:
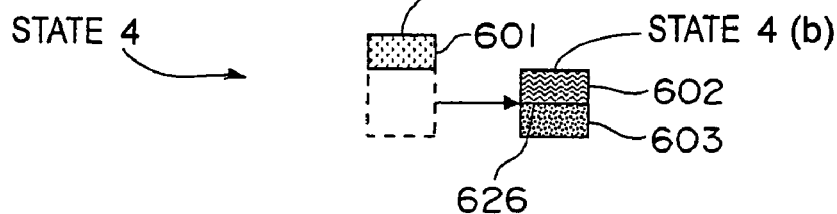
FIG. 27D is a view showing a tag in a "state 4" in which the tag main body is separated from the first tag fragment, and in which the first tag fragment is connected to the second tag fragment.

As shown in FIG. 27D, a "state 4(*a*)" indicates the tag main body 601 in a "state 4". A "state 4(*b*)" indicates the tag in which the first tag fragment 602 is separated from the tag main body 601 in the "state 4" and in which the first tag fragment 602 is connected to the second tag fragment 603.

The tag operations performed in the respective states will be described with reference to the flowcharts of FIGS. 28A to 28D.

Figure 28A:
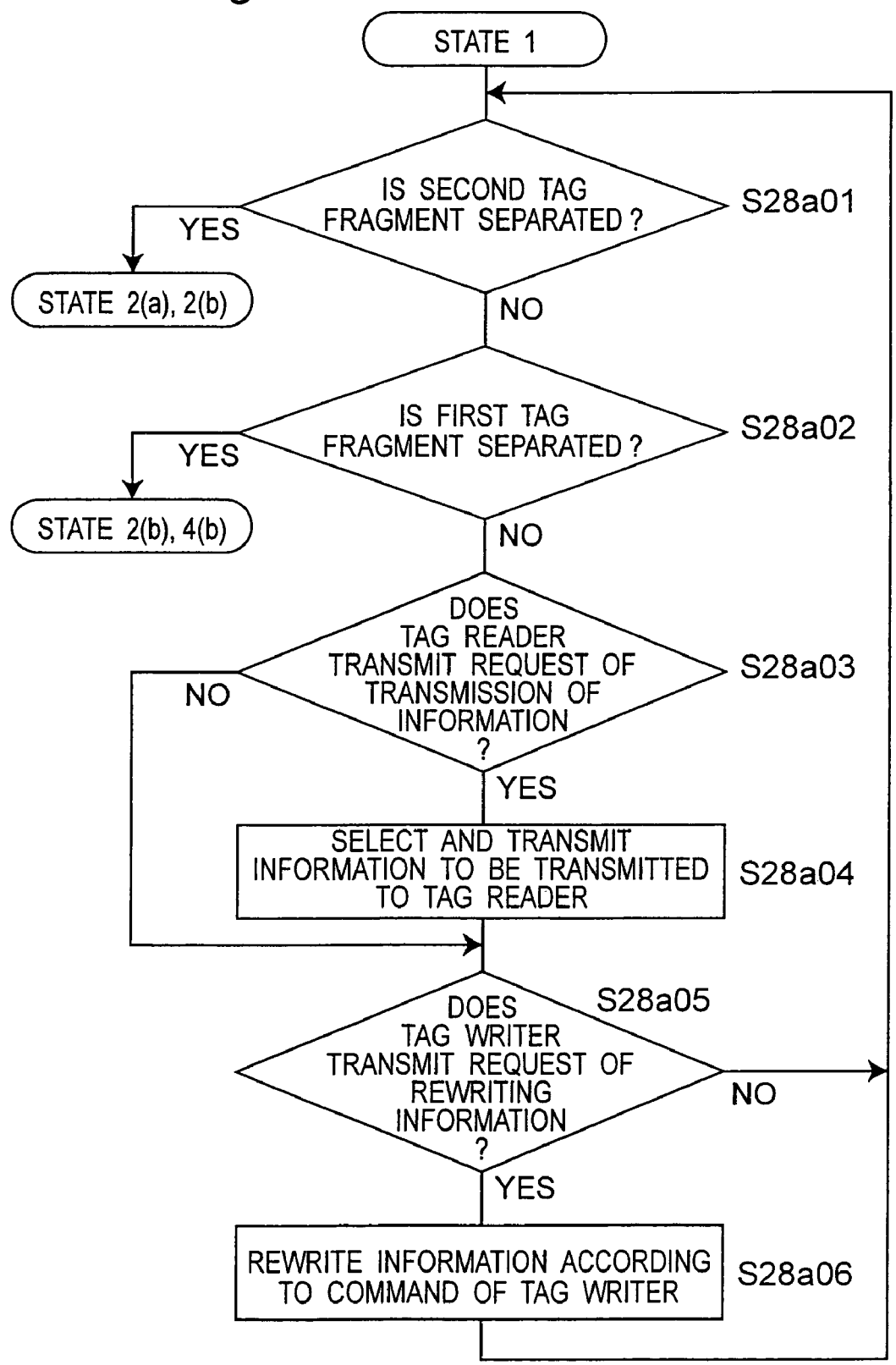
FIG. 28A is a flowchart of an operation performed by the tag in the "state 1" shown in FIG. 27A.

FIG. 28A is a flowchart of the operation performed by the tag in the "state 1" shown in FIG. 27A.

At a step S28*a*01, the exclusive OR circuit 623 that functions as the separation-state recognizing unit for the second tag fragment 603 determines whether the second tag fragment 603 is separated from the first tag fragment 602 at the separation position 626. If the second tag fragment 603 is separated from the first tag fragment 602 at the separation position 626, the exclusive OR circuit 623 determines that the state of the state recognition tag is moved to the "state 2". Then, the operation performed by the tag in which the tag main body 601 is connected to the first tag fragment 602 is moved to a flow of the flowchart of FIG. 28B for the operation performed by the tag in the "state 2(*a*)". The operation performed by the second tag fragment 603 is moved to a flow of the flowchart for the operation performed by the tag in the "state 2(*b*)" or the like shown in FIG. 28D. If the second tag fragment 603 is not separated from the first tag fragment 602 at the separation position 626, the operation goes to a step S28*a*02.

At the step S28*a*02, the exclusive OR circuits 614, 616, and 617 and the AND circuits 615, 618, and 619 that function as the separation-state recognizing unit for the first tag segment 602 determine whether the first tag fragment 602 is separated from the tag main body 601 at the separation position 625. If the first tag segment 602 is separated from the tag main body 601 at the separation position 625, the separation-state recognizing unit determines that the state of the state recognition tag is moved to the "state 4". The operation performed by the tag main body 601 is moved to a flow of the flowchart of FIG. 28D for the operation performed by the tag in the "state 2(*b*)" or the like. The operation of the tag in which the first tag fragment 602 is connected to the second tag fragment 603 is moved to a flow of the flowchart of FIG. 28C for the operation performed by the tag in the "state 4(*b*)". If the first tag fragment 602 is not separated from the tag main body 601 at the separation position 625, the operation goes to a step S28*a*03.

At the step S28a03, it is determined whether the tag reader/writer transmits a request of transmission of information. The determination as to whether the tag reader/writer transmits the request of transmission of information can be made by receiving an RF (Radio Frequency) signal generated by the tag reader/writer. A current is generated from the RF signal (by the antenna units) and electric power is supplied to the IC chip(s). Furthermore, the RF signal also includes request command data from the tag reader/writer.

If the tag reader/writer does not transmit the request of transmission of information, then no electric power is supplied from the antennas 604, 613 and 622, and the operation goes to a step S28a05. If the tag reader/writer transmits the request of transmission of information, electric power is supplied from all the antennas 604, 613, and 622. If so, the electric power is supplied to the IC chip 610 through the AND circuit 605 while no electric power is supplied to the IC chips 611, 612, 620, 621, and 624 through the corresponding AND circuits, respectively (see the circuit-specific electric power input/output tables shown in FIGS. 7A and 8A). As a result, the information recorded in the IC chip 610 is transmitted to the tag reader/writer (step S28a04).

At a step S28a05, it is determined whether the tag writer transmits a request of rewriting information. The determination as to whether the tag writer transmits a request of rewriting information can be made by receiving an RF (Radio Frequency) signal generated by the tag reader/writer. A current is generated from the RF signal (by the antenna units) and electric power is supplied to the IC chip(s). Furthermore, the RF signal also includes request command data from the tag reader/writer.

Figure 28B:
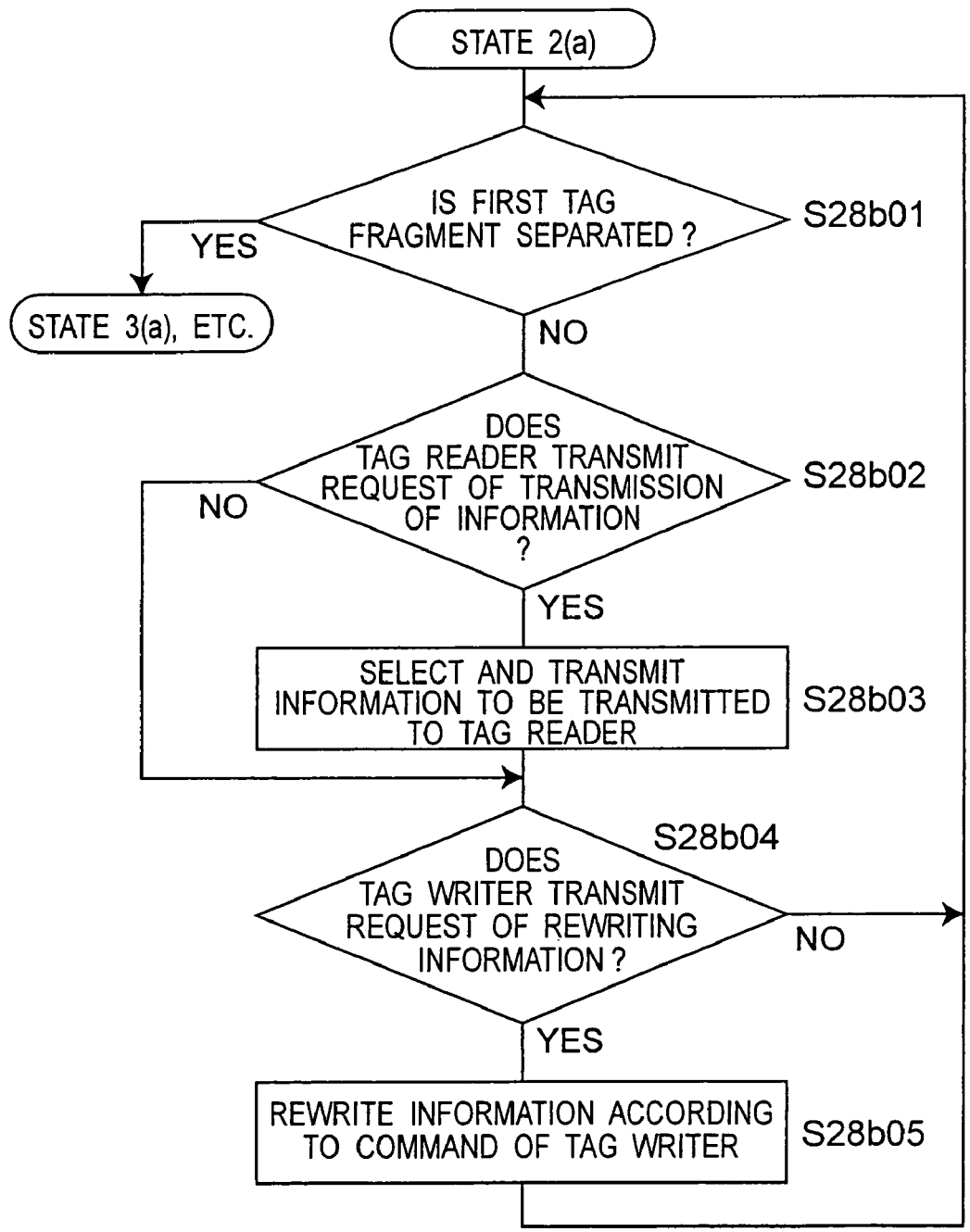
FIG. 28B is a flowchart of an operation performed by the tag in the "state 2(*a*)" shown in FIG. 27B.

If the tag writer does not transmit the request of rewriting the information, the operation returns to the step S28a01. If the tag writer transmits the request of rewriting the information, electric power is supplied to the IC chip 610 while no electric power is supplied to the IC chips 611, 612, 620, 621, and 624 similarly to the step S28a03. As a result, the information recorded in the IC chip 610 is rewritten by information transmitted from the tag reader/writer (at a step S28a06). Thereafter, the operation returns to the step S28a01. FIG. 28B is a flowchart of an operation performed by the tag in the "state 2(b)" shown in FIG. 27B.

At a step S28b01, the exclusive OR circuits 614, 616, and 617 and the AND circuits 615, 618, and 619 that function as the separation-state recognizing unit for the first tag fragment 602 determines whether the first tag fragment 602 is separated from the tag main body 601 at the separation position 625. If the first tag fragment 602 is separated from the tag main body 601 at the separation position 625, then the state of the state recognition tag is moved to the "state 3", and the operations performed by the tag main body 601 and the first tag fragment 602 are moved to a flow of the flowchart of FIG. 28D for the operations performed by the tags in the "states 3(a), 3(b), 3(c)" and the like, respectively. If the first tag fragment 602 is not separated from the tag main body 601 at the separation position 625, the operation goes to a step S28b02.

At the step S28b02, it is determined whether the tag reader/writer transmits a request of transmission of information. The determination as to whether the tag reader/writer transmits a request of transmission of information can be made by receiving an RF (Radio Frequency) signal generated by the tag reader/writer. A current is generated from the RF signal (by the antenna units), and electric power is supplied to the IC chip(s). Furthermore, the RF signal also includes request command data from the tag reader/writer.

If the tag reader/writer does not transmit the request of transmission of information, then no electric power is supplied from the antennas 601 and 613, and the operation goes to a step S28b04. If the tag reader/writer transmits the request of transmission of information, electric power is supplied from the antennas 604 and 613. Therefore, the electric power is supplied to the IC chip 611 through the respective logic circuits 606, 607, and 609 while no electric power is supplied to the IC chips 610, 612, 620, and 621 through the respective logic circuits. As a result, the information recorded in the IC chip 611 is transmitted to the tag reader/writer (step S28b03).

At a step S28b04, it is determined whether the tag reader/writer transmits a request of rewriting information. The determination as to whether the tag reader/writer transmits a request of rewriting information can be made by receiving an RF (Radio Frequency) signal generated by the tag reader/writer. A current is generated from the RF signal (by the antenna units), and electric power is supplied to the IC chip(s). Furthermore, the RF signal also includes request command data from the tag reader/writer.

If the tag reader/writer does not transmit the request of transmission of information, the operation returns to the step S28b01. If the tag reader/writer transmits the request of transmission of information, electric power is supplied to the IC chip 611 while no electric power is supplied to the IC chips 610, 612, 620, and 621 similarly to the step S28b02. As a result, the information recorded in the IC chip 611 is rewritten by the information transmitted from the tag reader/writer (step S28b05). Then, the operation returns to the step S28b01.

Figure 28C:
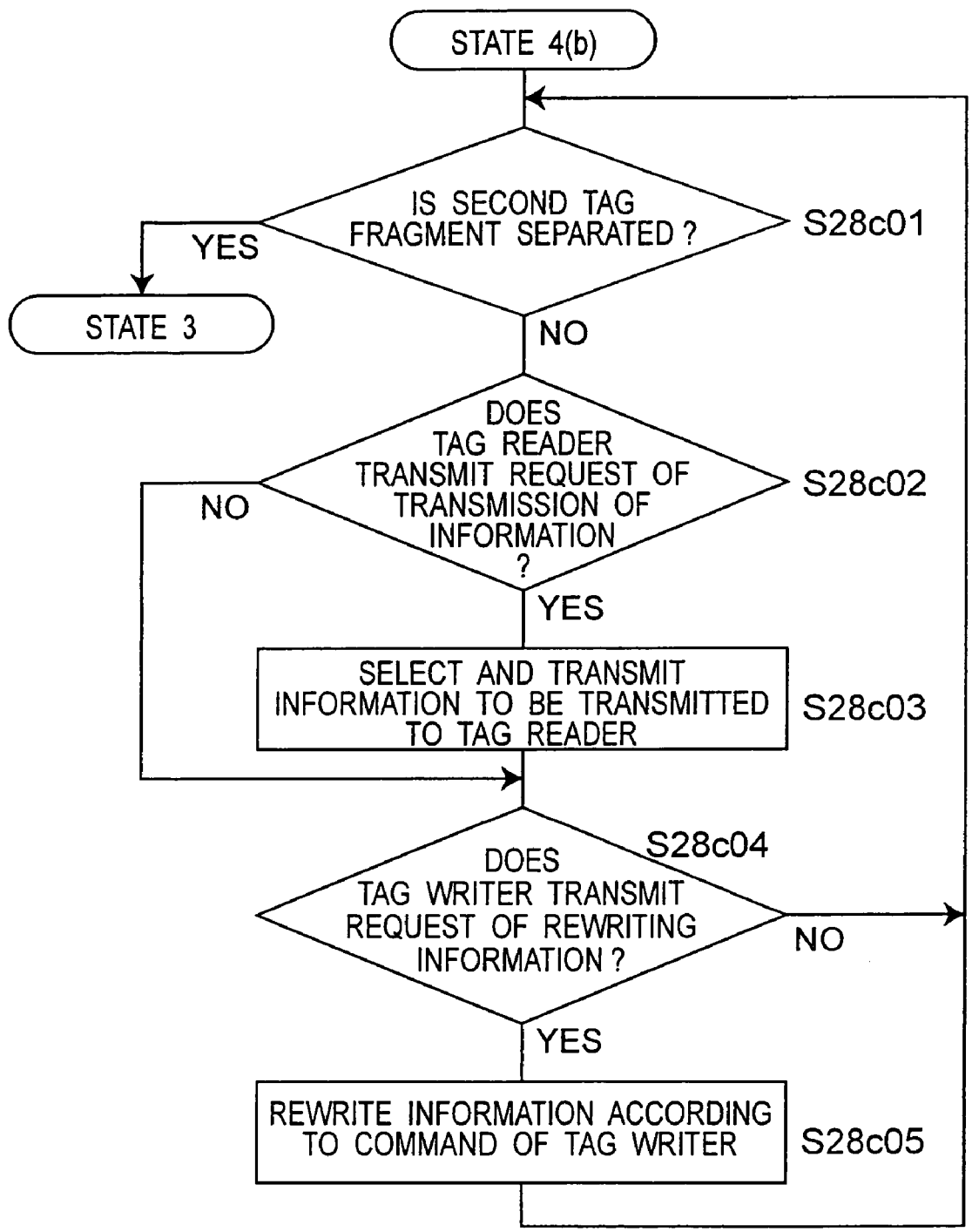
FIG. 28C is a flowchart of an operation performed by the tag in the "state 4(*b*)" shown in FIG. 27C.

FIG. 28C is a flowchart for an operation performed by the tag in the "state 4(b)" shown in FIG. 27C.

At a step S28c01, the exclusive OR circuit 623 that functions as the separation state recognizing unit for the second tag fragment 603 determines whether the second tag fragment 603 is separated from the first tag fragment 602 at the separation position 626. If the second tag fragment 603 is separated from the first tag fragment 602 at the separation position 626, it is determined that the state of the state recognition tag moves to the "state 3". The operation for the first tag fragment 602 and the tag fragment 603 move to the flow of the flowchart of FIG. 28D for the operation performed by the tag in the "state 2(b)" and such. On the other hand, if the second tag fragment 603 is not separated from the first tag fragment 602 at the separation position 626, the operation goes to a step S28c02.

At the step S28c02, it is determined whether the tag reader/writer transmits a request of transmission of information. The determination as to whether the tag reader/writer transmits a request of transmission of information can be made by receiving an RF (Radio Frequency) signal generated from the tag reader/writer. A current is generated from the RF signal (by the antenna units) and electric power is supplied to the IC chip(s) Furthermore, the RF signal also includes request command data from the tag reader/writer.

If the tag reader/writer does not transmit the request of transmission of information, then no electric power is supplied from the antennas 613 and 622, and the operation goes to a step S28c04. If the tag reader/writer transmits the request of transmission of information, electric power is supplied from the antennas 613 and 622. Therefore, the electric power is supplied to the IC chip 620 through the respective logic circuits 614, 615, and 618 while no electric power is supplied to the IC chips 621 and 624 through the respective logic circuits. As a result, the information recorded in the IC chip 620 is transmitted to the tag reader/writer (step S28c03).

At a step S28c04, it is determined whether the tag reader/writer transmits a request of rewriting information. The determination as to whether the tag reader/writer transmits a request of rewriting information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of rewriting information, the operation returns to the step S28c01. If the tag reader/writer transmits the request of rewriting information, electric power is supplied to the IC chip 620 while no electric power is supplied to the IC chips 621 and 624 similarly to the step S28c02. As a result, the information recorded in the IC chip 620 is rewritten by the information transmitted from the tag reader/writer (step S28c05). Then, the operation returns to the step S28c01.

Figure 28D:
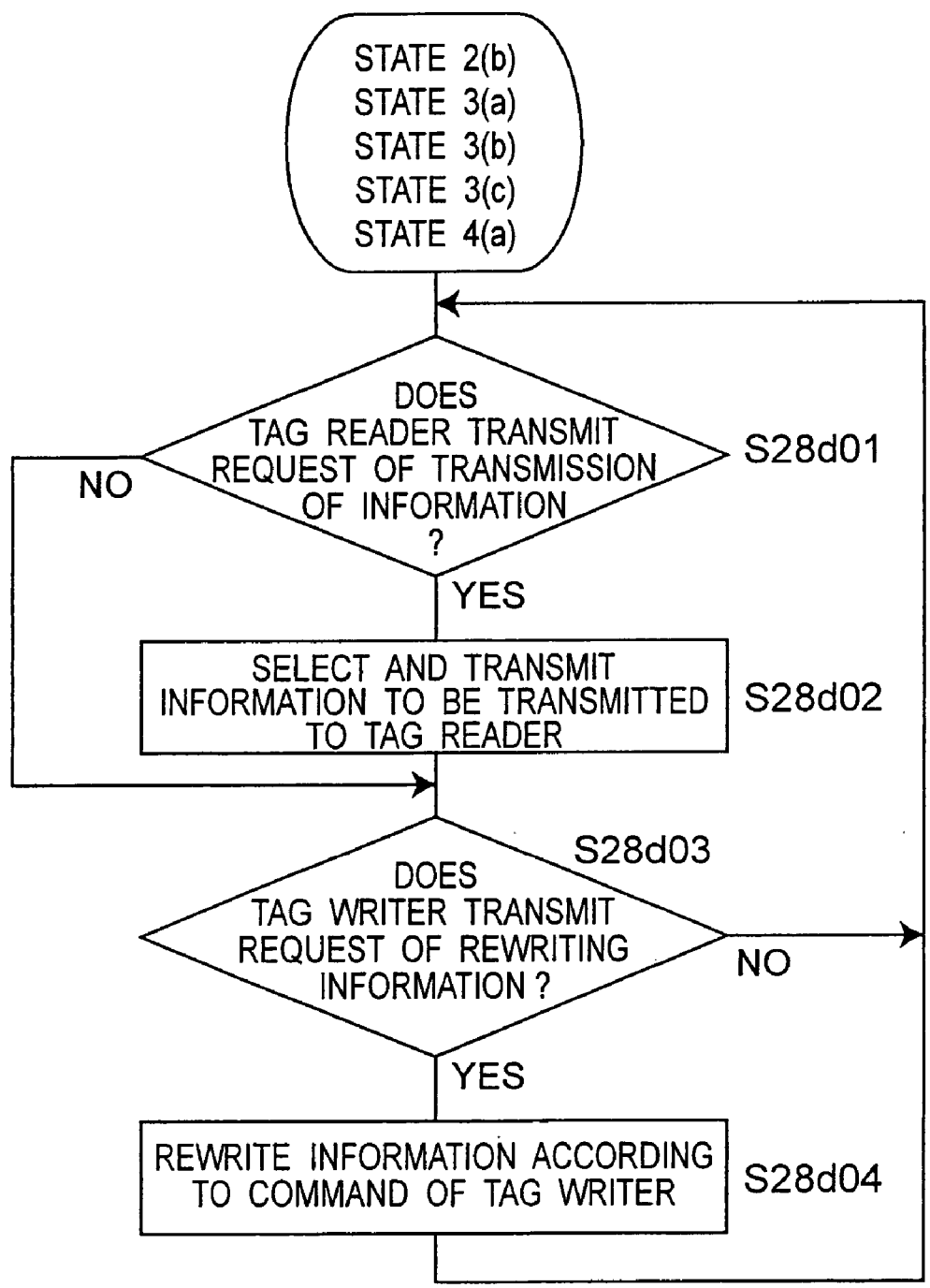
FIG. 28D is a flowchart of operations performed by the tags in the "states 2(*b*), 3(*a*), 3(*b*), 3(*c*), and 4(*a*)" shown in FIG. 27D.
Figure 29A:
FIG. 29A is a view showing an example of information of the tag main body of the state recognition tag when the state recognition tag is used for a light bulb shown in FIG. 10.
Figure 29C:
FIG. 29C is a view showing an example of information of the second tag fragment of the state recognition tag when the state recognition tag is used for the light bulb shown in FIG. 10.
Figure 30A:
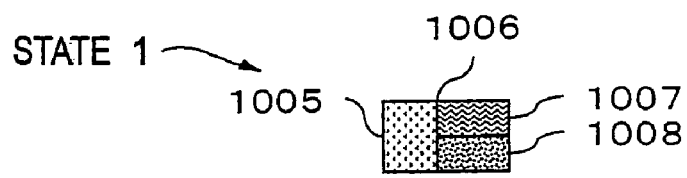
FIG. 30A is a view showing a tag in the "state 1" in which a tag main body, a first tag fragment, and a second tag fragment are connected to one another.
Figure 30B:
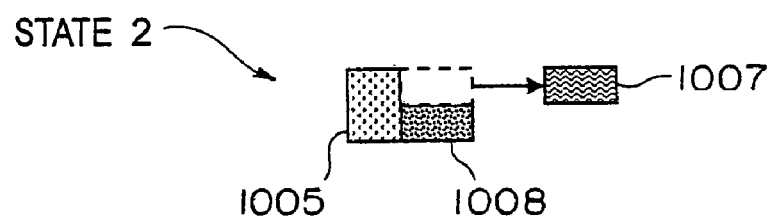
FIG. 30B is a view showing a tag in the "state 2" in which the tag main body is connected to the second tag fragment, and the first tag fragment is separated from the tag main body and the second tag fragment.
Figure 30C:
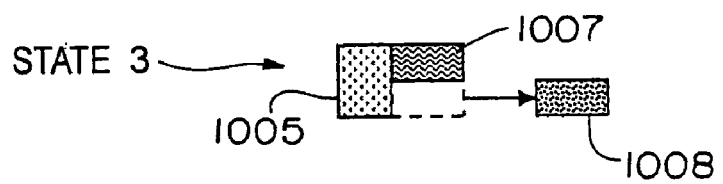
FIG. 30C is a view showing a tag in the "state 3" in which the tag main body is connected to the first tag fragment, and the second tag fragment is separated from the tag main body and the first tag fragment.
Figure 30D:
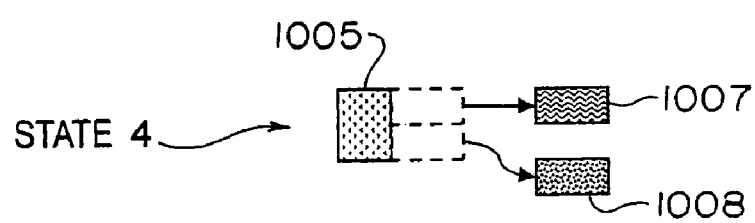
FIG. 30D is a view showing a tag in the "state 4" in which the first tag fragment and the second tag fragment are separated from the tag main body.

FIG. 28D is a flowchart of an operation performed by the tag in the "state 2(b)" shown in FIG. 27B, the "state 3(c)" shown in FIG. 27C, and the like.

At a step S28d01, it is determined whether the tag reader/writer transmits a request of transmission of information. The determination as to whether the tag reader/writer transmits a request of transmission of information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of transmission of information, then no electric power is supplied from the antennas 622, and the operation goes to a step S28d03. If the tag reader/writer transmits the request of transmission of information, electric power is supplied from the antenna 622. Therefore, the electric power is supplied to the IC chip 624 through the logic circuit 623. As a result, the information recorded in the IC chip 624 is transmitted to the tag reader/writer (step S28d02).

At a step S28d03, it is determined whether the tag reader/writer transmits a request of rewriting information. The determination as to whether the tag reader/writer transmits a request of rewriting information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of rewriting information, the operation returns to the step S28d01. If the tag reader/writer transmits the request of rewriting information, electric power is supplied to the IC chip 624 similarly to the step S28d01 in the "state 2(b) or 3(c)". As a result, the information recorded in the IC chip 624 is rewritten by the information transmitted from the tag reader/writer (step S28d04). Then, the operation returns to the step S28d01.

FIG. 28D is the flowchart of the operation performed by the tag in the "state 3(a)" shown in FIG. 27C, the "state 4(a)" shown in FIG. 27D, and the like.

At a step S28d01, it is determined whether the tag reader/writer transmits a request of transmission of information. The determination as to whether the tag reader/writer transmits a request of transmission of information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of transmission of information, then no electric power is supplied from the antenna 604, and the operation goes to a step S28d03. If the tag reader/writer transmits the request of transmission of information, electric power is supplied from the antenna 604. Therefore, the electric power is supplied to the IC chip 612 through the logic circuit 608 while no electric power is supplied to the IC chips 610 and 611 through the respective logic circuits. As a result, the information recorded in the IC chip 612 is transmitted to the tag reader/writer (step S28d02).

At a step S28d03, it is determined whether the tag reader/writer transmits a request of rewriting information. The determination as to whether the tag reader/writer transmits a request of rewriting information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of rewriting information, the operation returns to the step S28d01. If the tag reader/writer transmits the request of rewriting information, electric power is supplied to the IC chip 612 while no electric power is supplied to the IC chips 610 and 611 similarly to the step S28d01 in the "state 3(a) or 4(a)". As a result, the information recorded in the IC chip 612 is rewritten by the information transmitted from the tag reader/writer (step S28d04). Then, the operation returns to the step S28d01.

FIG. 28D is the flowchart of the operation performed by the tag in the "state 3(b)" shown in FIG. 27C and the like.

At the step S28d01, it is determined whether the tag reader/writer transmits a request of transmission of information. The determination as to whether the tag reader/writer transmits a request of transmission of information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of transmission of information, then no electric power is supplied from the antenna 613, and the operation goes to the step S28d03. If the tag reader/writer transmits the request of transmission of information, electric power is supplied from the antenna 613. Therefore, the electric power is supplied to the IC chip 621 through the respective logic circuits 616, 617, and 619 while no electric power is supplied to the IC chip 620 through the respective logic circuits. As a result, the information recorded in the IC chip 621 is transmitted to the tag reader/writer (step S28d02).

At the step S28d03, it is determined whether the tag reader/writer transmits a request of rewriting information. The determination as to whether the tag reader/writer transmits a request of rewriting information can be made by receiving an RF (Radio Frequency) signal generated from the tag reader/writer. A current is generated from the RF signal (by the antenna units) and electric power is supplied to the IC chip. Furthermore, the RF signal also includes request command data from the tag reader writer.

If the tag reader/writer does not transmit the request of rewriting information, the operation returns to the step S28d01. If the tag reader/writer transmits the request of rewriting information, electric power is supplied to the IC chip 621 while no electric power is supplied to the IC chip 620 similarly to the step S28d01 in the "state 3(b)". As a result, the information recorded in the IC chip 621 is rewritten by the information transmitted from the tag reader/writer (step S28d04). Then, the operation returns to the step S28d01.

By so constituting, the tag main body 601, the first tag fragment 602, and the second tag fragment 603 include the antennas 604, 613, and 622 as the electric power supplying units, and the IC chips 610, 611, and 612, 620 and 621, and 624 as the information holding units, respectively. Therefore, even after the first tag fragment 602 is separated from the tag main body 601 or even after the second tag fragment 603 is separated from the first tag fragment 602, it is possible to allow not only the tag main body 601 but also the separated first tag fragment 602 and second tag fragment 603 to function as tags. The information transmitted to the tag reader/writer can be changed according to the separation states of the tag main body, the first tag fragment, and the second tag fragment.

Figure 9:
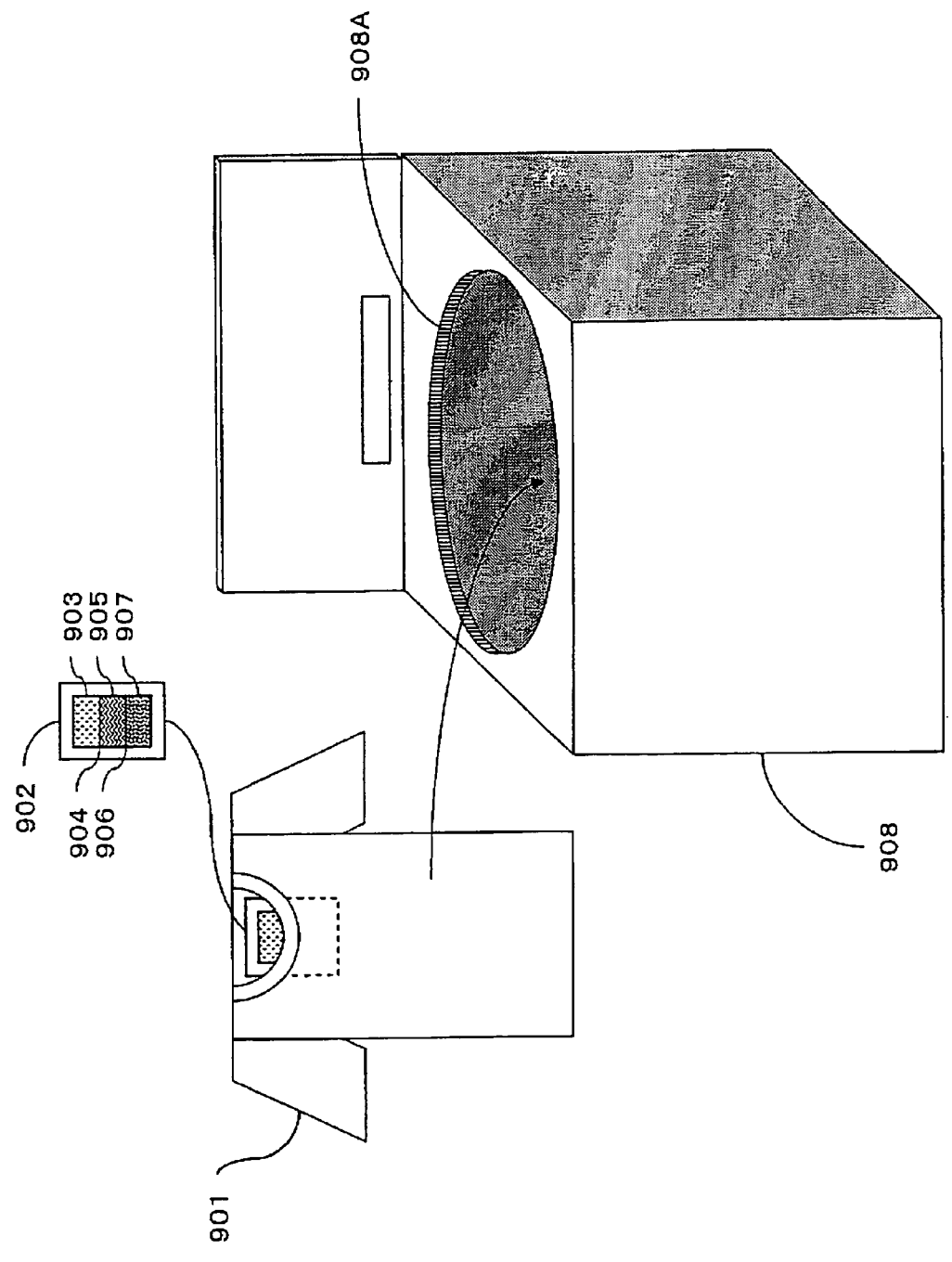
FIG. 9 is a perspective view of an example of use of the state recognition tag according to the second embodiment.

FIG. 9 shows an example of using the state recognition tag according to the second embodiment for clothing information on a shirt which a client bought and privacy protection. In the example of FIG. 9, a state recognition tag 902 corresponding to the state recognition tag according to the second embodiment is attached to a shirt 901 which the client bought. The state recognition tag 902 includes a tag main body 903 and two tag fragments 905 and 907. The first tag fragment 905 can be separated from the tag main body 903 at a separation position 904, and the second tag fragment 907 can be separated from the first tag fragment 905 at a separation position 906.

FIGS. 26A to 26F show an example of information recorded in the tag main body 903, the first tag fragment 905, and the second tag fragment 907.

Recorded information items shown in FIGS. 26A, 26C, and 26E are items of information recorded in the tag. Information such as a tag ID, a product number, a product name, a size, a color, a product address, and the number of times of washing is recorded in a tag-main-body information holding unit (corresponding to the tag-main-body information holding unit 102 shown in FIG. 1) of the tag main body 903. Likewise, information such as the tag ID, the product number, and an error code is recorded in a first-tag-fragment information holding unit (corresponding to the tag-fragment information holding unit 107 shown in FIG. 1) of the first tag fragment 905. In addition, information such as the tag ID, the product number, the product name, the size, the color, a manufacturing date, and a price is recorded in a second-tag-fragment information holding unit (corresponding to the tag-fragment information holding unit 107 shown in FIG. 1) of the second tag fragment 905.

In FIGS. 26A, 26C, and 26E, information variability indicates whether the information recorded in the tag can be rewritten. In the tag main body 903, the recorded information of the number of times of washing is rewritable. In the second tag fragment 905, the recorded price information is rewritable. Furthermore, in the tag main body 903, the information such as the tag ID, the product number, the product name, the size, the color, and the product address cannot be rewritten. In the first tag fragment. 905, the information such as the tag ID, the product number, and the error code cannot be rewritten. In the second tag fragment 905, the information such as the tag ID, the product number, the product name, the size, the color, and the manufacturing date cannot be rewritten.

In FIGS. 26A, 26C, and 26E, "each information transmittable state" indicates each state (separation state or connection state) shown in FIGS. 27A to 27D in which state the information on the recorded information items can be transmitted from the tag main body 903 and the first and second tag fragments 905 and 907.

Figure 26D:
FIG. 26D is a view showing an example of information held by the first tag fragment in a case where the state recognition tag according to the second embodiment is used for the clothing shown in FIG. 9.

In FIGS. 26B, 26D, and 26F, examples of the held information are those of information recorded respectively in the tag main body 903 and the first and second tag fragments 905 and 907 of the state recognition tag 902 attached to the shirt 901.

An example of using the state recognition tag shown in FIG. 9 will be described with reference to the flowchart of FIG. 28A for the operation performed by the tag in the "state 1". However, because the flowchart of FIG. 28A for the operation performed by the tag in the "state 1" is already described above, the example of using the state recognition tag will not be described in detail with reference to the flowchart.

For the operation performed by the tag in the "state 1" shown in FIG. 28A, it is assumed that the "state 1" is a state in which the tag main body 903 is connected to the first tag fragment 905 and in which the first tag fragment 905 I connected to the second tag fragment 907, which state will be referred to as "initial state".

The initial state of the shirt 901 is estimated as a state before the shirt 901 is bought, i.e., a state in which the shirt 901 is present in a shop. In the initial state, information transmitted from the state recognition tag is desirably information for the shop or a shop clerk.

Therefore, if the tag reader/writer transmits a request of transmission of information in the "state 1" (step S28a03), the information of the tag ID, the product number, the product name, the size, the color, the manufacturing date, and the price among the information recorded in the second tag fragment 907 is transmitted to the tag reader/writer (step S28a04) (see the example of held information shown in FIGS. 26B, 26D, and 26F for an example of actual information).

If the price of the shirt 901 is reduced for a bargain sale or the like, the tag writer can rewritten the price information recorded in the second tag fragment 907 (steps S28a05 and S28a06).

Here, assume that a customer bought the shirt 901. If so, the clerk separates the second tag fragment 907 from the tag main body 903 to be able to provide the second tag fragment 907 (tag in the "state 2(b)") including the information for the shop and the state recognition tag (tag in the "state 2(a)") including the information for the customer, respectively (step S28a01).

For the second tag fragment 907 that turns the tag in the "state 2(b)" can continuously, information is transmitted therefrom similarly to the tag in the "state 1" (steps S28d01 and S28d02) and the information can be rewritten (steps S28d03 and S28d04).

The state recognition tag that turns the tag in the "state 2(a)" is attached to the shirt 901 after the purchase. As described, the information transmitted from the state recognition tag is preferably the information for the customer.

Therefore, if the tag reader/writer transmits a request of transmission of information in the "state 2(a)" (step S28b02), the information of the tag ID, the product number, the product name, the size, the color, the product address, and the number of times of washing among the information recorded in the tag main body 903 is transmitted to the tag reader/writer (step S28b03). The customer can thereby know a degree of damage of the shirt 901 from the information of the number of times of washing and more detailed clothing information (e.g., trousers and a jacket suitable for the shirt 901) from the information of the product address.

Moreover, by providing a tag reader/writer 908A at an entrance of a drum of a washing machine 908 into which entrance clothing is input, the information of the number of times of washing recorded in the tag main body 903 can be rewritten (steps S28*b*04 and S28*b*05). If a washing method or the like is described and held in the tag main body 903, information on the washing method optimum for the shirt 901 can be automatically set to the washing machine 908 by causing the tag reader/writer 908A of the washing machine 908 to read the information of the washing method.

However, if the customer goes out while wearing the tag-attached clothing, the information recorded in the tag may possibly be read by a third party without being noticed by the customer.

Considering the possibility, the information transmitted from the state recognition tag can be restricted by causing the customer to separate the first tag fragment 905 from the tag in the "state 2(*a*)" (step S28*b*01).

After separation, if the tag reader/writer transmits a request of transmission of information (step S28*d*01), only the information of the tag ID, the product number, the product name, the color, and the product address is selected from among the information recorded in the tag main body 903 attached to the shirt 901 which turns the tag in the "state 3(*a*)", and transmitted to the tag reader/writer (step S28*d*02). By doing so, the information such as the size of the shirt and the number of times of washing which the customer does not want to be known is not transmitted, so that privacy is protected.

For the tag in the "state 1", if the clerk erroneously separates the first tag fragment 905 from the tag main body 903 (step S28*a*02), then the state recognition tag left in the shop turns the tag in the "state 4(*b*)", and an error code is transmitted from the tag to the tag reader/writer in response to the request of transmission of information from the tag reader/writer (steps S28*c*02 and S28*c*03). As examples of a method of transmitting the error code, "tag cutting error" may be displayed on a display unit of the tag reader/writer or a display unit of a PC (personal computer) connected to the tag reader/writer as shown in FIG. 26D.

With the configuration of the state recognition tag, if the first tag fragment 905 is connected to the tag main body 903 and the second tag fragment 907 is connected to the first tag fragment, three information selecting options can be provided per tag based on the connection-separation states of the respective tags. It is thereby possible to transmit appropriate information to the user while flexibly dealing with the state of the tag-attached article.

Figure 10:
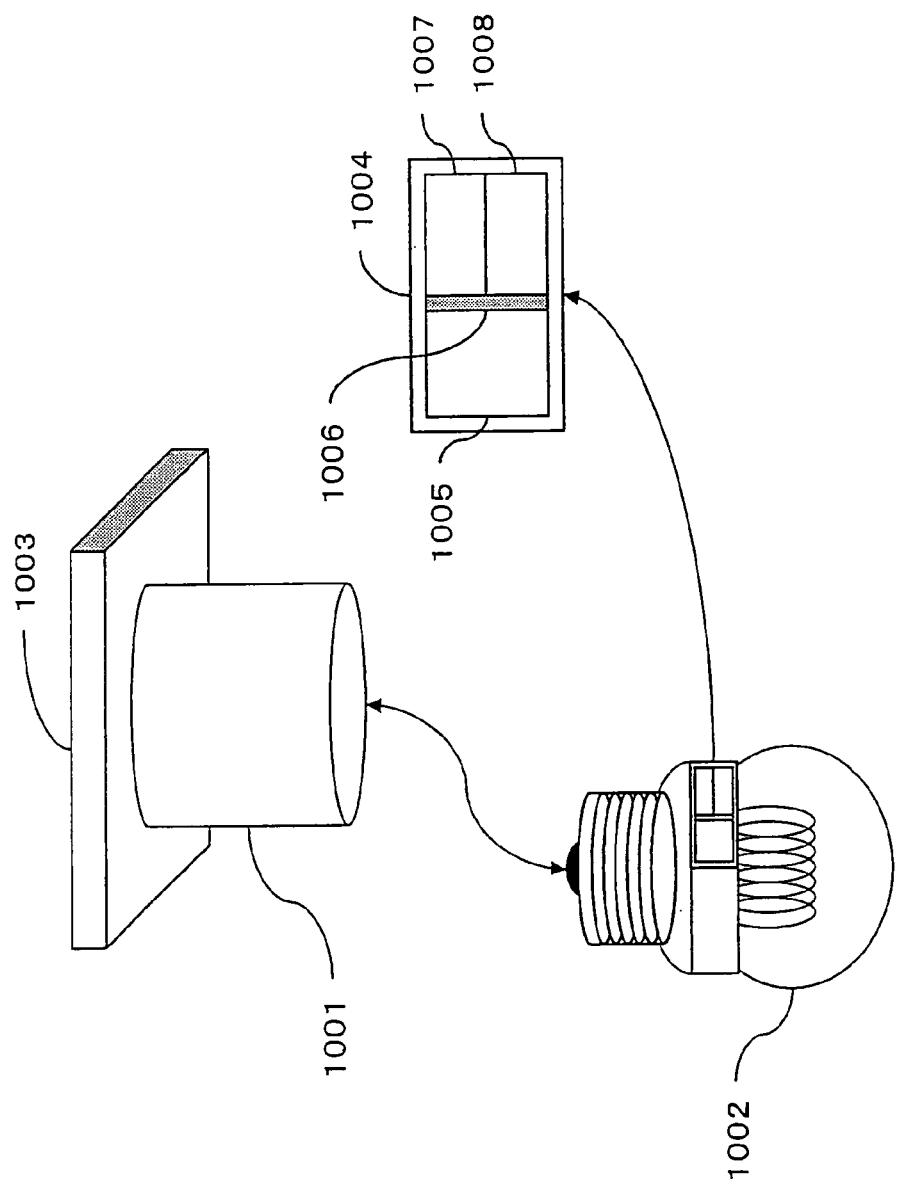
FIG. 10 is a perspective view of another example of use of the state recognition tag according to the second embodiment.

FIG. 10 shows another example of using the state recognition tag according to the second embodiment for a light bulb for an illuminator 1001 which a customer buys.

A state recognition tag 1004 corresponding to the state recognition tag 600 according to the second embodiment is attached to a light bulb 1002 which a customer buys. The state recognition tag 1004 includes a tag main body 1005 and two tag fragments, i.e., a first tag fragment 1007 and a second tag fragment 1008. The first and second tag fragment 1007 and 1008 can be respectively separated from the tag main body 1005 at a separation position 1006. Product information on the light bulb 1002 is recorded in the tag main body 1005. The first tag fragment 1007 includes neither functions nor information as a tag. The product information on the light bulb 1002 is recorded in the second tag fragment 1008. The second tag fragment 1008 does not function as a tag when the first tag fragment 1007 is connected to the second tag fragment 1008, and functions as a tag and becomes information-writable when the first tag fragment 1007 is separated from the second tag fragment 1008. Namely, the product information and information from a tag reader/writer 1003 are recorded in the second tag fragment 1008. At the start of using the light bulb 1002, the first tag fragment 1007 is separated from the second tag fragment 1008 and time information is written to the second tag fragment 1008 from the tag reader/writer 1003. This facilitates estimating time of replacing the light bulb 1002 by a new one. Furthermore, information on the illuminator 1001 may be written to the second tag fragment 1008, and the customer may separate the second tag fragment 1008 from the tag main body 1005 to take the separated second tag fragment 1008 to a light bulb shop. By doing so, the shop can provide a light bulb most suitable for the illuminator 1001 to the customer while referring to the information on the illuminator 1001 recorded in the second tag fragment 1008.

The example of information recorded in the state recognition tag in this state is shown in FIGS. 29A to 29D. However, the respective items of the information will not be described in detail because the respective items of the information are already described above. FIGS. 30A to 30D show respective states described in FIGS. 29A to 29D.

By so constituting, the first tag fragment 1007 and the second tag fragment 1008 are independently and separably arranged with respect to the tag main body 1005. When the first tag fragment 1007 is connected to the second tag fragment 1008, the second tag fragment 1008 does not function as a tag. When the first tag fragment 1007 is separated from the second tag fragment 1008, the second tag fragment 1008 functions as a tag and information can be written to the second tag fragment 1008. It is thereby possible to cause a desired tag fragment to function as a tag only when needed.

Furthermore, the second embodiment exhibits the following advantages besides the functions and advantages of the first embodiment. The separation position can be provided at an arbitrary location. In addition, it is possible to set, in more detail, presence/absence of functions as a tag, change of information, and the like to correspond to the separation position at which the tag fragments 1007 and 1008 are separated from the tag main body 1005, a combination of the tag fragments 1007 and 1008, the number of tag fragments, and the like.

THIRD EMBODIMENT

FIGS. 11A, 11B, 11C, and 11D show various examples of a separation position at which a tag main body 1105 of a state recognition tag according to a third embodiment of the present invention is separated from a tag fragment 1106, respectively. The state recognition tag according to the third embodiment may be the state recognition tag previously described or a state recognition tag to be described later.

Figure 11A:
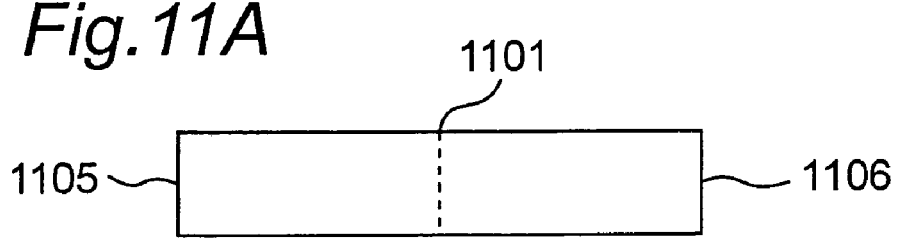
FIG. 11A is a view showing one of various examples of a separation position of a state recognition tag according to a third embodiment of the present invention.

In the example of FIG. 11A, a perforation (an example of a break) is formed at a separation position 1101. A user can easily separate the tag fragment 1106 from the tag main body 1105 at the separation position 1101 without being conscious of the separation position.

Figure 11B:
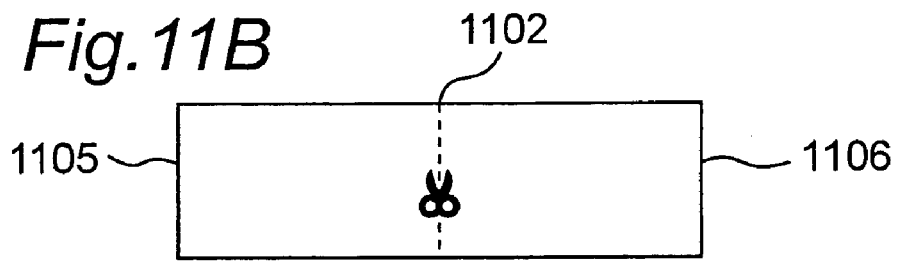
FIG. 11B is a view showing one of various examples of the separation position of the state recognition tag according to the third embodiment of the present invention.
Figure 11C:
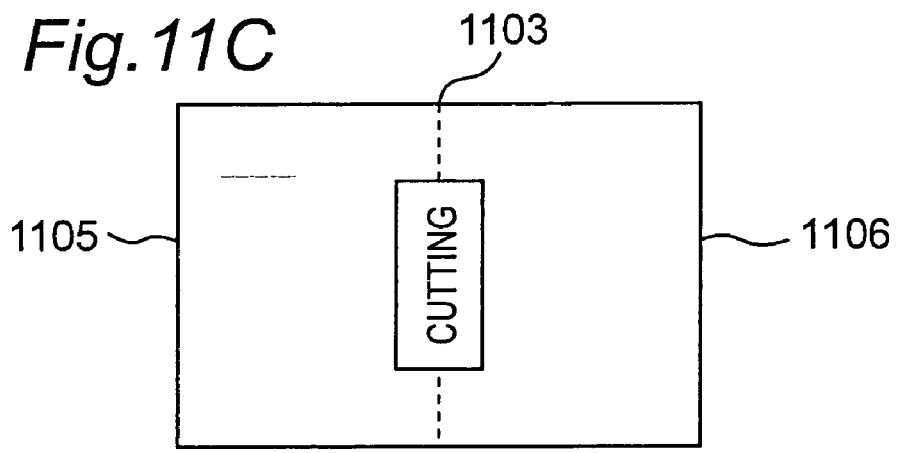
FIG. 11C is a view showing one of various examples of the separation position of the state recognition tag according to the third embodiment of the present invention.
Figure 11D:
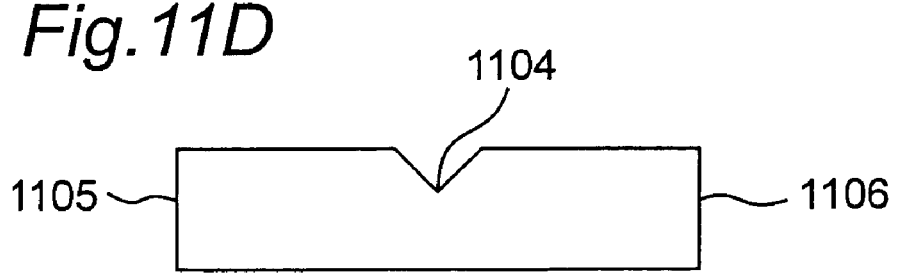
FIG. 11D is a view showing one of various examples of the separation position of the state recognition tag according to the third embodiment of the present invention.

In the example of FIG. 11B, a picture of scissors is drawn at a separation position 1102 on which the perforation is formed. By doing so, it is possible to ensure that the user can recognize the separation position at which the fragment 1106 is separated from the tag main body 1105.

In the example of FIG. 1C, a character "cutting" is further printed at a separation position 1103. It is thereby possible to ensure that the user can recognize the separation position at which the fragment 1106 is separated from the tag main body 1105.

In the example of FIG. 1D, a cutting edge is provided at a separation position 1104. This makes it possible for the user to easily separate the tag fragment 1106 from the tag main body 1105 at the separation position 1104.

While the examples of the separation position between the tag main body 1105 and the tag fragment 1106 have been described, the examples can be applied as a separation position between tag fragments.

Further, FIGS. 12A, 12B, 12C, and 12D are views showing various examples of a method of fixing and separating the state recognition tag according to the fourth embodiment to and from an article, respectively.

Figure 12A:
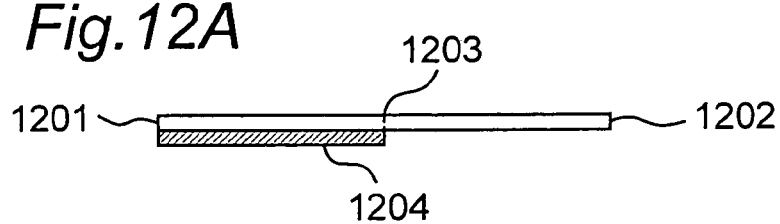
FIG. 12A is a view showing an example of a method of fixing and separating the state recognition tag according to the third embodiment to and from an article.
Figure 12B:
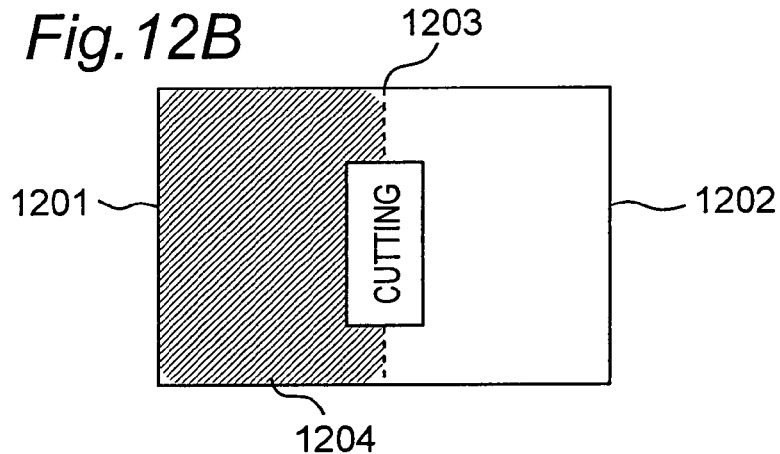
FIG. 12B is a view showing another example of the method of fixing and separating the state recognition tag according to the third embodiment to and from the article.
Figure 12C:
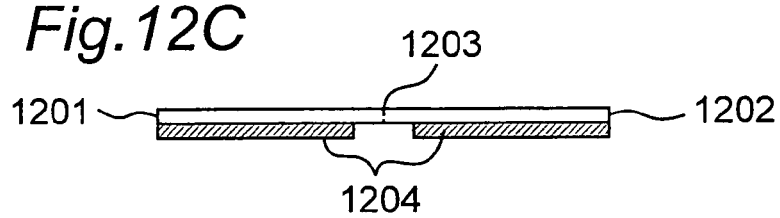
FIG. 12C is a view showing yet another example of the method of fixing and separating the state recognition tag according to the third embodiment to and from the article.
Figure 12D:
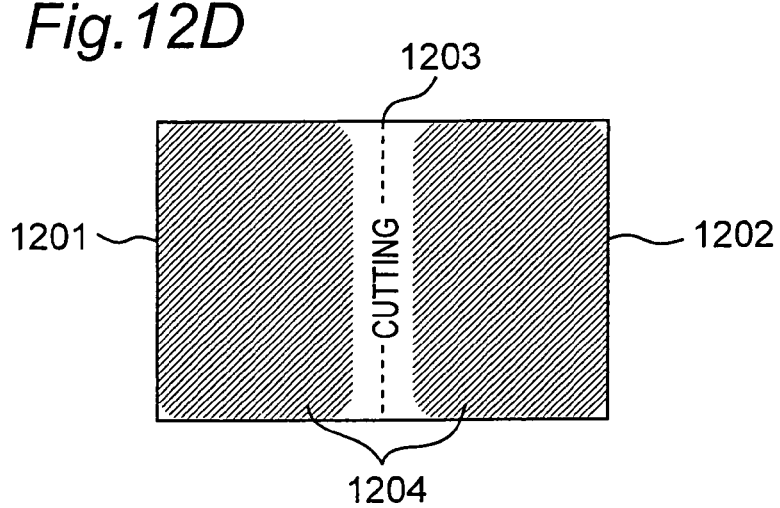
FIG. 12D is a view showing yet another example of the method of fixing and separating the state recognition tag according to the third embodiment to and from the article.

As shown in FIGS. 12A and 12B, a tab 1204 for sticking to be attached to the article is provided only to a tag main body 1201 or a tag fragment 1202. By doing so, it is possible to prevent the tag main body from being separated from the article while the tag fragment is attached to the article although a manufacturer of the state recognition tag intends to leave the tag main body attached to the article, and prevent the tag fragment from being separated from the article while the tag main body is attached to the article although the manufacturer of the state recognition tag intends to leave the tag fragment attached to the article. Furthermore, as shown in FIGS. 12C and 12D, by not providing the tag 1204 to be attached to the article only near the separation position 1203, it is possible to ensure that a user separates the tag fragment 1202 from the tag main body 1201.

Further, FIGS. 13A, 13B, 13C, 13D, 13E, and 13F are views showing yet other examples of the separation position of the state recognition tag according to the third embodiment, respectively.

Figure 13A:
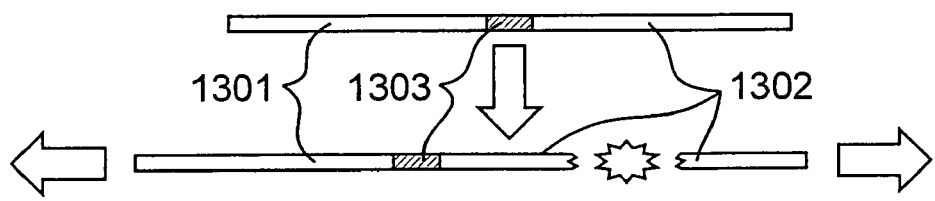
FIG. 13A is a view showing yet another example of the separation position of the state recognition tag according to the third embodiment.
Figure 13B:
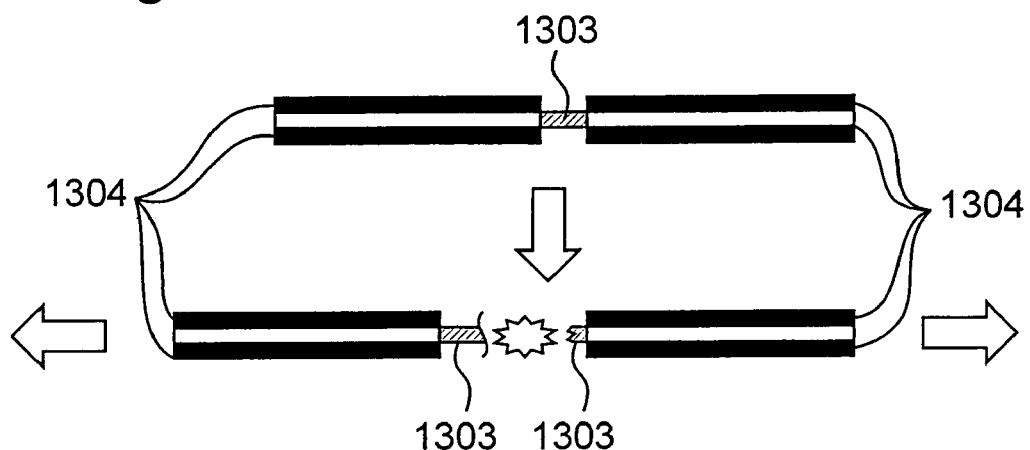
FIG. 13B is a view showing yet another example of the separation position of the state recognition tag according to the third embodiment.
Figure 13C:
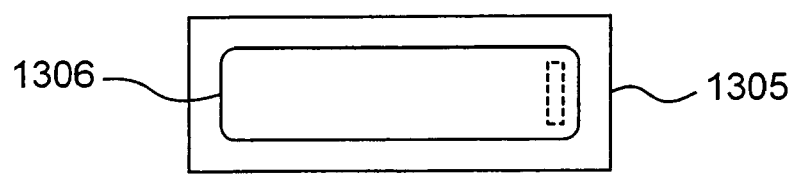
FIG. 13C is a view showing yet another example of the separation position of the state recognition tag according to the third embodiment.
Figure 13D:
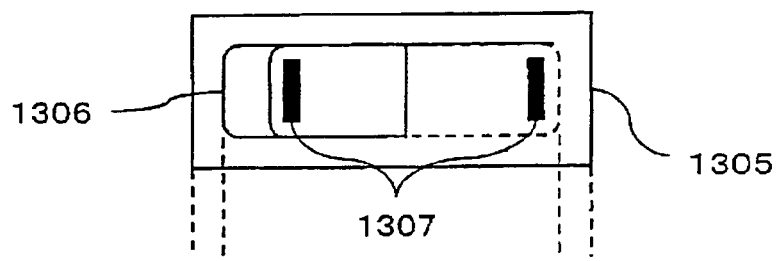
FIG. 13D is a view showing yet another example of the separation position of the state recognition tag according to the third embodiment.
Figure 13E:
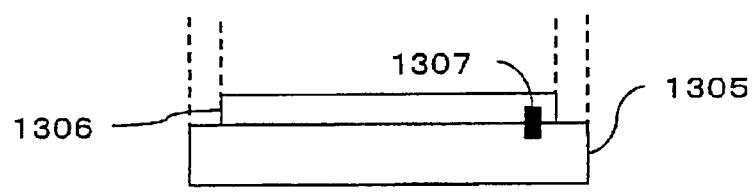
FIG. 13E is a view showing yet another example of the separation position of the state recognition tag according to the third embodiment.
Figure 13F:
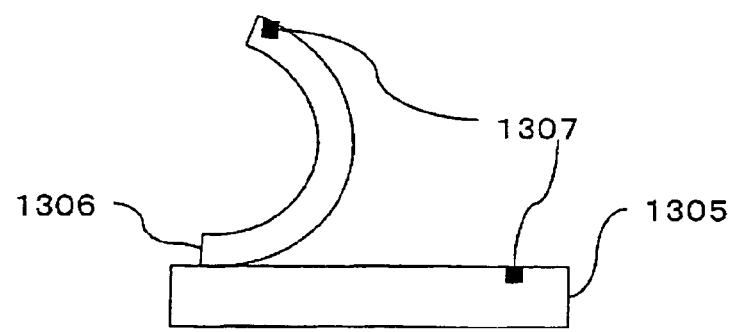
FIG. 13F is a view showing yet another example of the separation position of the state recognition tag according to the third embodiment.

A separation position 1303 is made of a material such as paper or vinyl easily separable by the power of a user. A reinforcement member 1304 such as hard metal or plastic is used around a tag main body 1301 and a tag fragment 1302. The user can thereby naturally separate the tag fragment 1302 from the tag main body 1301 at the separation position 1303 as shown in FIG. 13B without erroneously separating the tag fragment 1302 from the tag main body 1301 at a location other than the separation position as shown in FIG. 13A.

As shown in FIGS. 13C to 13F, a tag main body 1305 is a seal base, a tag fragment 1306 is a seal, and the seal (tag fragment 1306) is peeled off from the seal base (tag main body 1305), whereby the tag fragment 1306 can be separated from the tag main body 1305. By exposing conductors 1307 as separation positions to a front surface of the seal base (tag main body 1305) and a rear surface of the seal (tag fragment 1306), the first and second embodiments can be realized.

According to the third embodiment, when the user separates the tag, the tag is not separated at the portion at which the manufacturer of the state recognition tag does not intend to separate the tag, and it is unnecessary for the user to be conscious of the separation position of the tag.

FOURTH EMBODIMENT

Figure 14A:
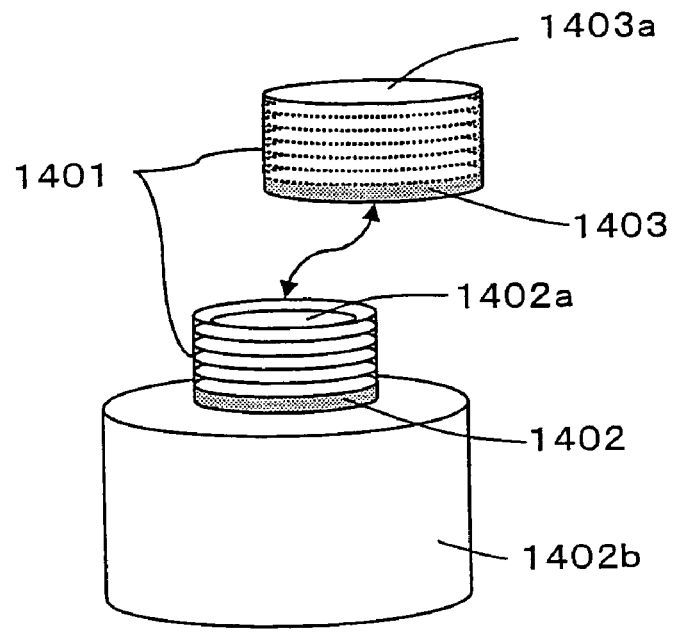
FIG. 14A is a perspective view of an example of use of a state recognition tag according to a fourth embodiment of the present invention.
Figure 14B:
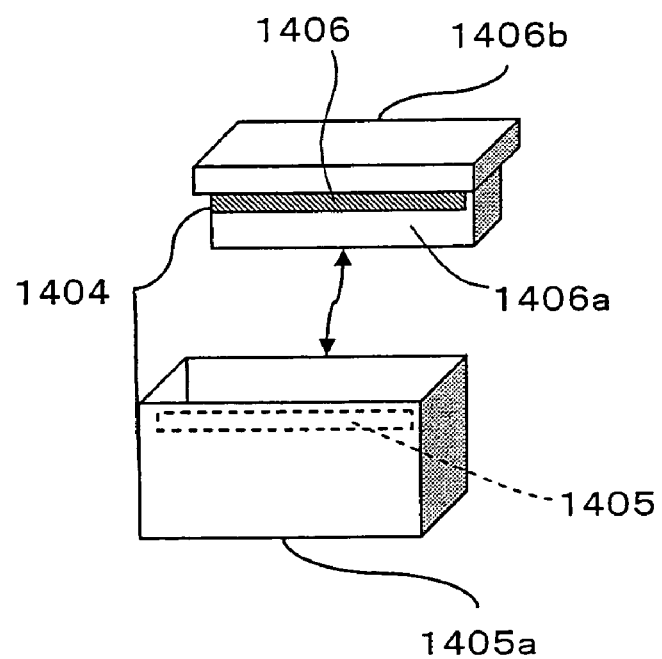
FIG. 14B is a perspective view of an example of use of the state recognition tag according to the fourth embodiment of the present invention.
Figure 14C:
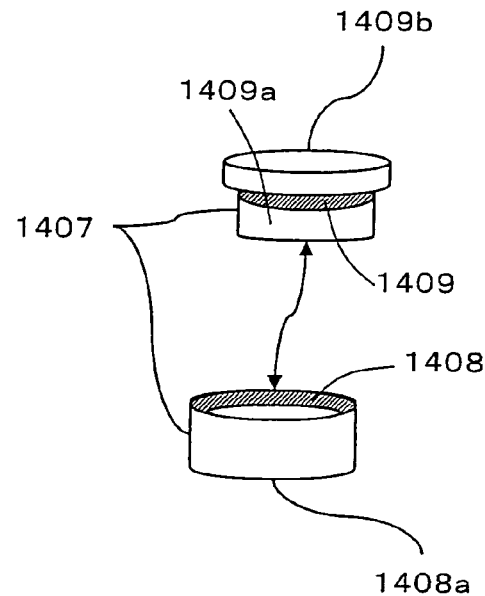
FIG. 14C is a perspective view of an example of use of the state recognition tag according to the fourth embodiment of the present invention.

FIGS. 14A, 14B, and 14C are views showing various examples of an engagement structure that is arranged at a separation position of a state recognition tag according to the fourth embodiment of the present invention, that is separable and engageable, and that is reconnectable after separation, respectively.

Figure 15A:
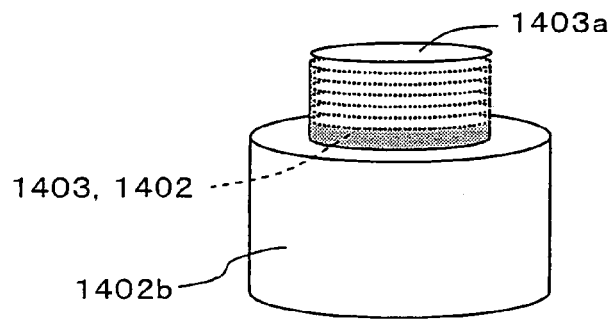
FIG. 15A is a perspective view of an example of use of the state recognition tag according to the fourth embodiment shown in FIG. 14A.
Figure 15B:
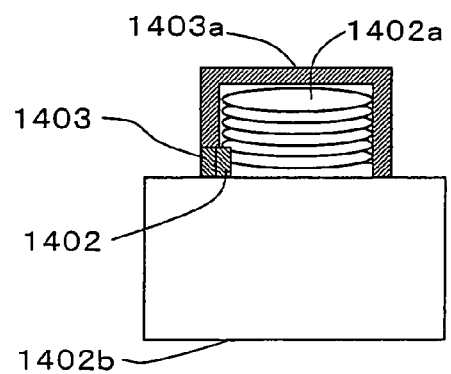
FIG. 15B is a partially cross-sectional view of an example of use of the state recognition tag according to the fourth embodiment shown in FIG. 14A.

As shown in FIG. 14A, a first state recognition tag 1401 is configured to include a band-shaped first tag main body 1402 and a band-shaped first tag fragment 1403. The first tag main body 1402 is arranged at a proximal portion of an opening portion 1402a having a male screw (an example of one engagement unit (e.g., a first engagement unit)) formed on an outer peripheral surface of a container main body 1402b. The first tag fragment 1403 is arranged on an end of an inner peripheral surface of a cap 1403a including a female screw (an example of another engagement unit (e.g., a second engagement unit)) engaged with the male screw of the opening portion 1402a of the container main body 1402b. By screwing the cap 1403a into the opening portion 1402a of the container main body 1402b, the first tag main body 1402 is connected to the first tag fragment 1403 (see FIGS. 15A and 15B). On the other hand, by loosening the screws between the opening portion 1402a of the container main body 1402b and the cap 1403a, the first tag main body 1402 is separated from the first tag fragment 1403. In this manner, the engagement structure can facilitate connecting and separating the first tag main body 1402 to and from the first tag fragment 1403.

Figure 15C:
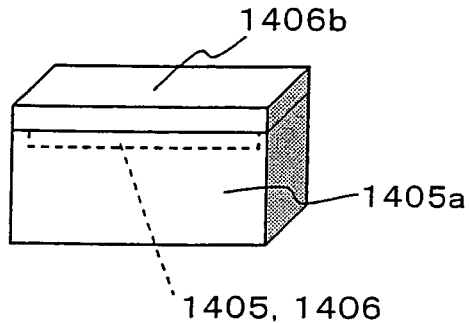
FIG. 15C is a perspective view of an example of use of a state recognition tag according to a fifth embodiment shown in FIG. 14B.
Figure 15D:
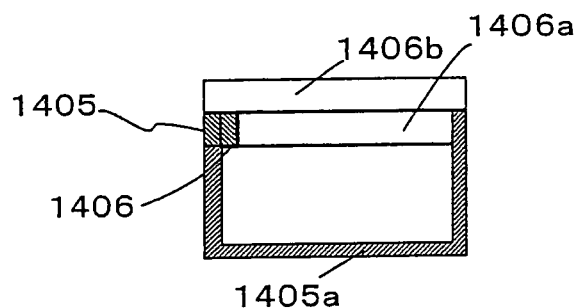
FIG. 15D is a partially cross-sectional view of an example of use of the state recognition tag according to the fifth embodiment shown in FIG. 14B.

Moreover, as shown in FIG. 14B, a second state recognition tag 1404 is configured to include a band-shaped second tag main body 1405 and a band-shaped second tag fragment 1406. The second tag main body 1405 is arranged on an inner surface of a rectangular opening portion (an example of one engagement unit) of a rectangular box 1405a. The second tag fragment 1406 is arranged on a side surface of an insertion portion 1406a of a cap 1406b that includes the rectangular parallelepiped insertion portion (an example of another engagement unit) 1406a that can be detachably fitted into the rectangular opening portion of the rectangular box 1405a, and that has a T-shaped side surface. By fitting the insertion portion 1406a of the cap 1406b into the rectangular opening portion of the rectangular box 1405a, the second tag main body 1405 is connected to the second tag fragment 1406 (see FIGS. 15C and 15D). On the other hand, by drawing out the insertion portion 1406a of the cap 1406b from within the rectangular opening portion of the rectangular box 1405a, the second tag fragment 1406 is separated from the second tag main body 1405. The engagement structure can facilitate connecting and separating the second tag fragment 1406 to and from the second tag main body 1405.

Figure 15E:
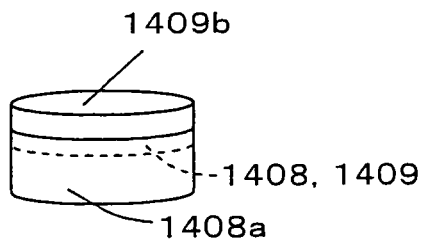
FIG. 15E is a perspective view of an example of use of the state recognition tag according to the fifth embodiment shown in FIG. 14C.
Figure 15F:
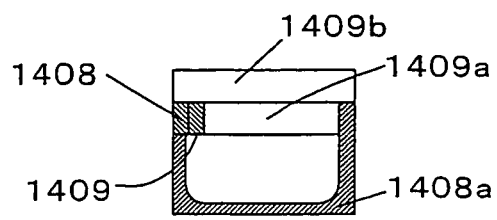
FIG. 15F is a partially cross-sectional view of an example of use of the state recognition tag according to the fifth embodiment shown in FIG. 14C.

Furthermore, as shown in FIG. 14C, a third state recognition tag 1407 is configured to include a band-shaped third tag main body 1408 and a band-shaped third tag fragment 1409. The third tag main body 1408 is arranged on an inner surface of a circular opening portion (an example of one engagement unit) of a circular box 1408a. The third tag fragment 1409 is arranged on a side surface of an insertion portion 1409a of a cap 1409b that includes the circular parallelepiped insertion portion (an example of another engagement unit) 1409a that can be detachably fitted into the circular opening portion of the circular box 1408a, and that has a T-shaped side surface. By fitting the insertion portion 1409a of the cap 1409b into the circular opening portion of the circular box 1408a, the third tag main body 1408 is connected to the third tag fragment 1409 (see FIGS. 15E and 15F). On the other hand, by drawing out the insertion portion 1409a of the cap 1409b from within the circular opening portion of the circular box 1408a, the third tag fragment 1409 is separated from the third tag main body 1408. The engagement structure can facilitate connecting and separating the third tag fragment 1409 to and from the third tag main body 1408.

The exemplary configurations can be applied to, for example, a container main body and a cap of a PET bottle or a main body and a cap of a chemical bottle. Using the state recognition tag, it is possible to recognize whether the bottle is opened or unopened and whether the cap is opened or closed, and strictly manage an expiration date. Furthermore, the first state recognition tag 1401, the second state recognition tag 1404, and the third state recognition tag 1407 differ in a shape of the separation positions. For instance, the second tag fragment 1406 or the third tag fragment 1409 is not connected to the first tag main body 1402. Therefore, it is possible to effectively prevent the tag fragment 1406 or 1409 different from the first fragment 1403 from being erroneously connected to the first tag main body 1402.

FIGS. 15A to 15F are views showing states in which the tag main bodies and the tag fragments shown in FIGS. 14A to 14C are connected to one another. By employing the contact sensor according to the first embodiment in the contact portion in which each tag main body is connected to each tag fragment, and conductive materials in the configuration according to the second or third embodiment, it is possible to recognize the connection state and the separation state of the tag. The conductive material is preferably a material, e.g., silver or copper, having a high conductivity. The connection between the tag main body and the tag fragment and the connection between the tag fragments according to each embodiment of the present invention mean that the tag main body partially or entirely electrically contacts with the tag fragment or the tag fragments are partially or entirely electrically contact with each other (it is to be noted that electrical contact is only an example and the contact may be realized using the contact sensor shown in FIG. 2). In addition, the separation between the tag main body and the tag fragment and the separation between the tag fragments mean that the tag main body is partially or entirely out of electrical contact with the tag fragment or the tag fragments are partially or entirely out of electrical contact with each other.

If the conductive material is used for the separation position, resistors having different resistances are incorporated into a tag fragment A and a tag fragment B so that the resistance applied to a tag main body A when the tag fragment A is connected to the tag main body A differs from the resistance applied to the tag main body A when the tag fragment B is connected to the tag main body A. By so configuring, the tag main body A can cause the separation-state recognizing unit to recognize which is connected to the tag main body A, the tag fragment A or the tag fragment B by measuring the resistances generated when the respective tag fragments are connected to the tag main body A by an ohmmeter.

It is assumed herein that the tag fragment that is originally connected to the tag main body A is the tag fragment A. In this case, even when the tag fragment B is connected to the tag main body A, the tag main body A can cause the control unit to transmit, to the tag reader/writer, information indicating that the tag fragment A is separated from the tag man body A or information indicating that a different tag fragment is connected to the tag main body A. A detection method of detecting whether the tag fragment B shown is the tag fragment of the tag main body A is an example, and the other method can be applied to the present invention.

Figure 22:
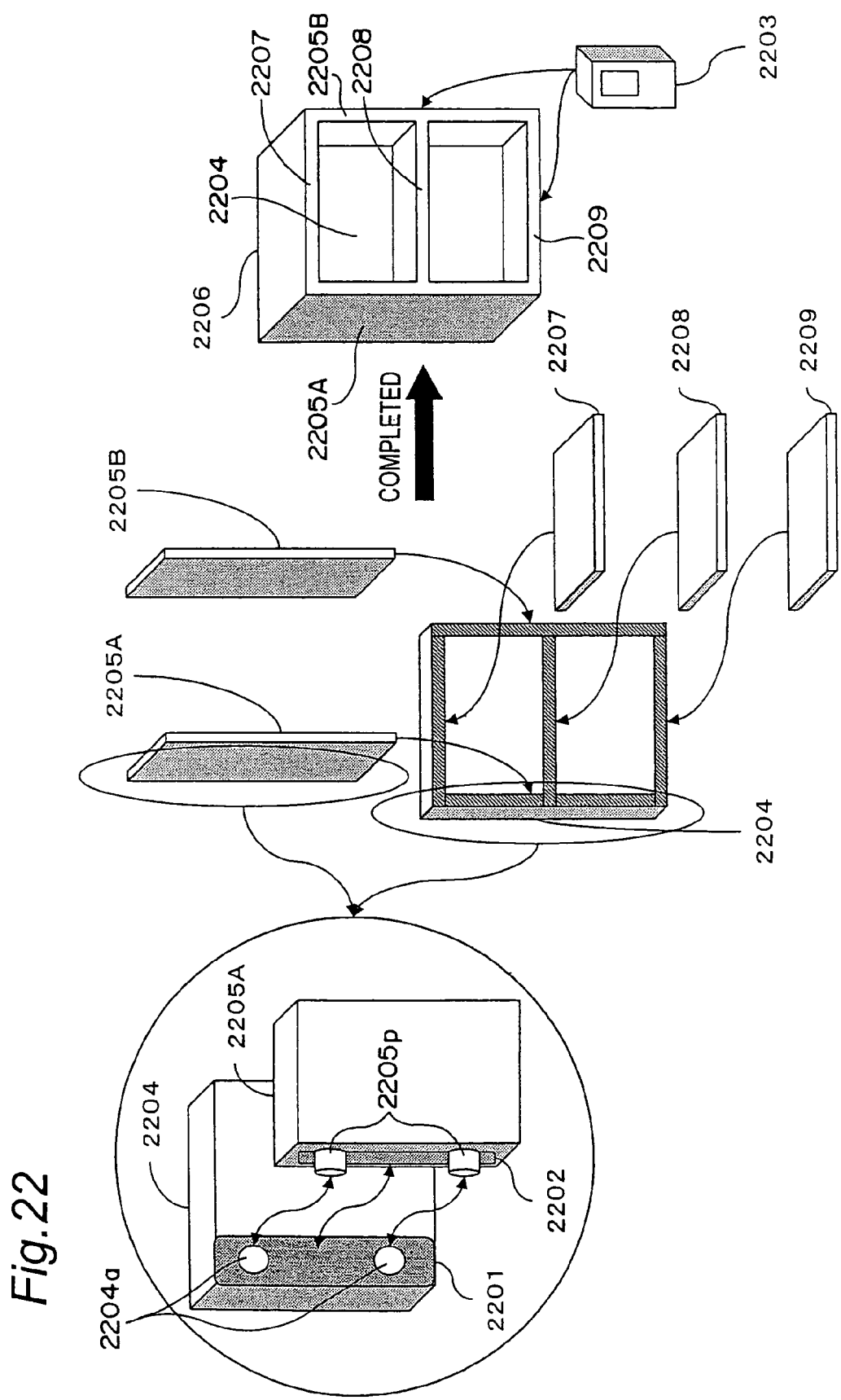
FIG. 22 is a view showing an example of an engagement structure that is arranged at a separation position of the state recognition tag according to the fourth embodiment of the present invention, that is separable and engageable, and that is reconnectable after separation.

FIG. 22 is a view showing an example of an engagement structure (engagement unit) that is arranged at a separation position of the state recognition tag according to the fourth embodiment of the present invention, that is separable and engageable, and that is reconnectable after separation.

Reference numeral 2206 denotes a shelf completed with an assembly operation. Reference numeral 2204 denotes a back plate, and 2205A and 2205B denote side plates. Two protrusions 2205p of the side plate 2205A or 2205B are fitted into two fitting holes 2204a of the back plate 2204, respectively, thereby attaching the side plate 2205A or 2205B to the back plate 2204 and connecting a tag fragment 2202 to a tag main body 2201. Reference numeral 2203 denotes a tag reader/writer, which can read information on the tag main body 2201 and that on the tag fragment 2202, respectively.

FIG. 23 shows an example in which information to be transmitted differs according to the separation state of the tag fragment 2202 with respect to the tag main body 2201 attached to a side-plate insertion portion of the back plate 2204. Detailed information held by the respective tags is omitted.

If the side plate 2205 is inserted into the side-plate insertion portion of the back plate 2204, then the tag main body 2201 is connected to the tag fragment 2202, and information indicating that "side plate is normally attached" is transmitted to the tag reader/writer 2203.

If no component is attached to the side-plate insertion portion of the back plate 2204, the tag main body 2201 and the tag fragment 2202 transmit, to the tag reader/writer 2203, information indicating that "side plate is not attached" and information indicating that "not attached to back plate", respectively.

If the top plate 2207 is inserted into the side-plate insertion portion of the back plate 2004, then the tag main body 2201 is connected to a different tag fragment attached to the top plate 2207, and both the tag main body 2201 and the different tag fragment transmit, to the tag reader/writer 2203, information indicating that "different component is attached", respectively.

Figure 24A:
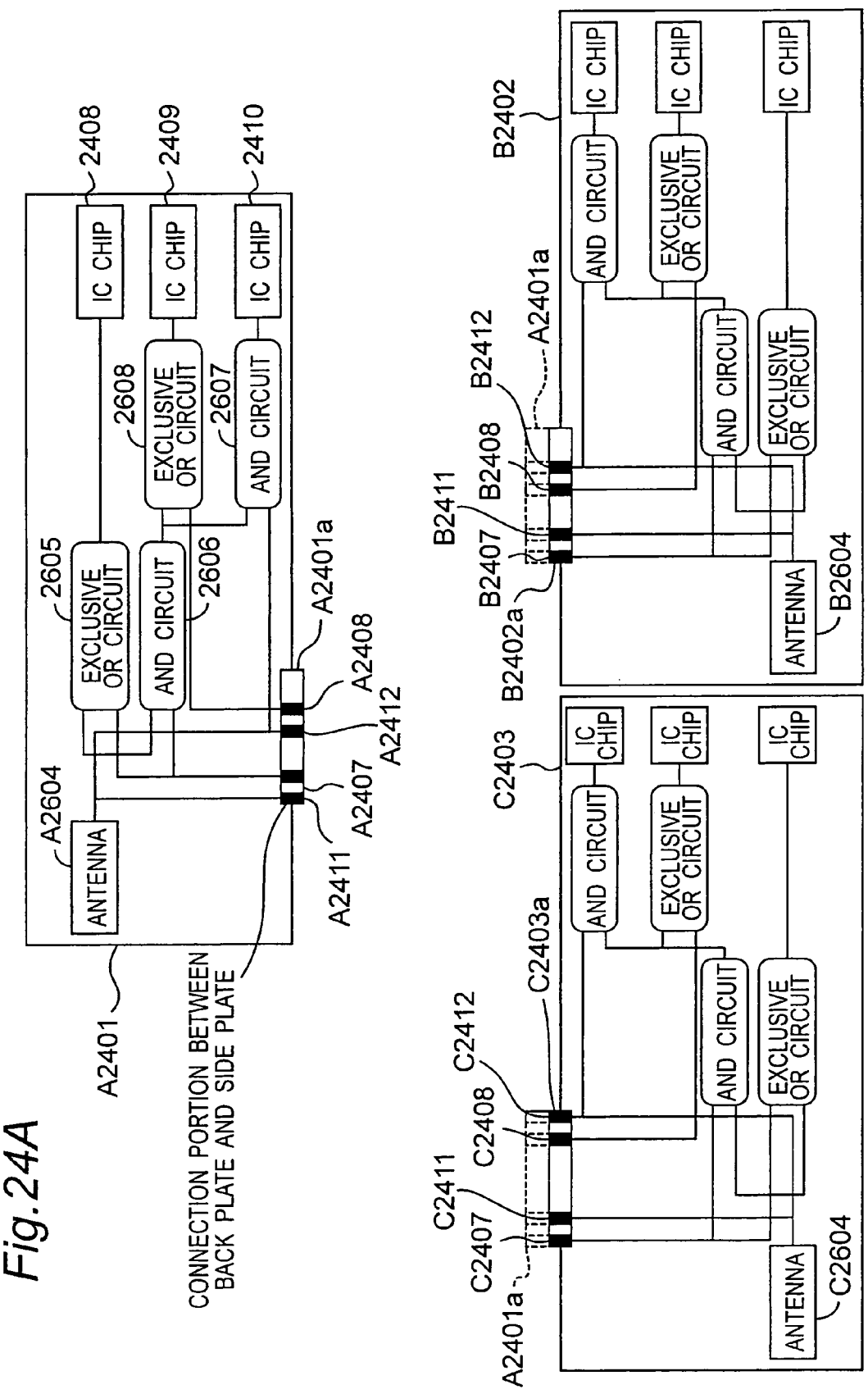
FIG. 24A is a view showing an example of a configuration of the state recognition tag according to the fourth embodiment of the present invention for realizing the transmission of information shown in FIG. 23.

FIGS. 24A and 24B show an example of a configuration and an example of information of the state recognition tag for realizing transmission of information shown in FIG. 23, respectively. In FIG. 24A, to help understand the engagement relationship between an engagement unit B2402a of a tag fragment B2402 and an engagement unit A2401a of a tag main body A2401, a state in which the engagement unit A2401a contacts with the engagement unit B2402a is indicated by dotted lines. Likewise, to help understand the engagement relationship between an engagement unit C2403a of a tag fragment C2403 and the engagement unit A2401a of the tag main body A2401, a state in which the engagement unit A2401a contacts with the engagement unit C2403a is indicated by dotted lines.

A tag main body A2401 corresponds to the tag main body 2201, a tag fragment B2402 corresponds to the tag fragment 2202, and a tag fragment C2403 corresponds to the different tag fragment. Because the tag main body A2401 is originally engaged with the tag fragment B2402, symbols "A" and "B" are put in front of the reference numerals 2401 and 2402, respectively to distinguish the tag main body 2401 and the tag fragment 2402 from a different tag main body and a different tag fragment. Accordingly, symbol "C" is put in front of the reference numeral 2403 that denotes the different tag main body and the different tag fragment to distinguish the different tag main body and the different tag fragment 2403 from the tag main body A2401 and the tag fragment B2402. Reference symbols A2401a, B2402a, and C2403a denote the engagement unit of the tag main body A2401, the engagement unit of the tag fragment B2402, and the engagement unit of the tag fragment C2403 different from the tag fragment B2402, respectively.

A black-color portion A2407 in the engagement unit A2401a of the tag main body A2401 is a tag-connection-detection electric power receiving unit of the tag main body 2401, which unit consists of a conductor. Electric power is supplied from the tag fragment B2402 or C2403 to the tag main body A2401 through the tag-connection-detection electric power receiving unit A2407. It is thereby possible to detect that the tag fragment B2402 or C2403 is connected to the tag main body A2401.

Furthermore, a black-color portion A2411 in the engagement unit A2401a of the tag main body A2401 is a tag-connection-detection electric power supplying unit of the tag main body A2401, which unit consists of a conductor. The tag-connection-detection electric power supplying unit A2411 supplies electric power generated from an antenna A2604 of the tag main body A2401 to the tag fragment B2402 or C2403 connected to the tag main body A2401.

If the tag-connection-detection electric power receiving unit A2407 is connected to a tag-connection-detection electric power supplying unit B2411 or C2411, electric power is transmitted from the tag-connection-detection electric power supplying unit B2411 or C2411 (from antennas B2604 or C2604) to the tag-connection-detection electric power receiving unit A2407. In addition, if a tag-connection-detection electric power receiving unit B2407 or C2407 is connected to the tag-connection-detection electric power supplying unit A2411, electric power is transmitted from the tag-connection-detection electric power supplying unit A2411 to the tag-connection-detection electric power receiving unit B2407 or C2407.

A black-color portion A2408 in the engagement unit A2401a of the tag main body A2401 is a correct-tag-connection-detection electric power receiving unit of the tag main body A2401, which unit consists of a conductor. Electric power is supplied from the tag fragment B2402 to the tag main body A2401 through the correct-tag-connection-detection electric power receiving unit A2408, whereby it is possible to detect that the tag fragment B2402 which is originally connected to the tag main body A2401 is connected to the tag main body A2401.

Moreover, a black-color portion A2412 in the engagement unit A2401a of the tag main body A2401 is a correct-tag-connection-detection electric power supplying unit of the tag main body A2401, which unit consists of a conductor. Electric power generated from the antenna A2604 of the tag main body A2401 is supplied from the correct-tag-connection-detection electric power supplying unit A2412 to the tag fragment B2402 connected to the tag main body A2401.

Here, by connecting the correct-tag-connection-detection electric power receiving unit A2408 to the correct-tag-connection-detection electric power supplying unit B2412, the electric power is transmitted from the correct-tag-connection-detection electric power supplying unit A2412 to the correct-tag-connection-detection electric power receiving unit B2408. In addition, by connecting the correct-tag-connection-detection electric power receiving unit B2408 to the correct-tag-connection-detection electric power supplying unit A2412, the electric power is transmitted from the correct-tag-connection-detection electric power supplying unit B2412 (antenna B2604) to the correct-tag-connection-detection electric power receiving unit A2408.

Each pair of the correct-tag-connection-detection electric power receiving unit A2408 and the correct-tag-connection-detection electric power supplying unit B2412, and the correct-tag-connection-detection electric power receiving unit B2408 and the correct-tag-connection-detection electric power supplying unit A2412 are located at positions at which they are connected to each other only when the tags that are to be originally connected are connected to each other. Due to this, no electric power is transmitted from the correct-tag-connection-detection electric power supplying unit C2412 of the tag fragment C2403 which is not to be originally engaged with the tag main body A2401 to the correct-tag-connection-detection electric power receiving unit A2408. Likewise, no electric power is transmitted from the correct-tag-connection-detection electric power supplying unit A2412 to the correct-tag-connection-detection electric power receiving unit C2408 of the tag fragment C2403 which is not to be originally engaged with the tag main body A2401.

By so configuring, if neither the tag fragment B2402 nor the tag fragment C2403 are connected to the tag main body A2401, then the electric power is supplied only from the antenna A2604, the electric power is supplied from an exclusive OR circuit 2605 to an IC chip 2408, and information for the case in which no tag fragment is connected to the tag main body A2401, e.g., "side plate is not attached" is transmitted from the IC chip 2408 to the tag reader/writer. Because detailed operations are basically the same as those shown in FIG. 3 or FIG. 6, they will not be described herein.

If the tag fragment B2402 is connected to the tag main body A2401, then the electric power is supplied from the antenna A2604 and the correct-tag-connection-detection electric power supplying units B2411 and B2412 of the tag fragment B2402, the electric power is supplied to an IC chip 2410 through AND circuits 2606 and 2607, and information for the case in which the tag main body A2401 is connected to the tag fragment B2402, e.g., "side plate is normally attached" is transmitted from the IC chip 2410 to the tag reader/writer.

If the tag fragment C2403 is connected to the tag main body A2401, then the electric power is supplied only from the antenna A2604 and the tag-connection-detection electric power supplying unit C2411 of the tag fragment C2403, the electric power is supplied to an IC chip 2409 through the AND circuit 2606 and the exclusive OR circuit 2608, and information for the case in which the tag main body A2401 is connected to the tag fragment which is not supposed to be connected to the tag main body A2401, e.g., "component different from side plate is attached" is transmitted from the IC chip 2409 to the tag reader/writer.

According to the above described embodiment, the tag main body and the tag fragment are connectable and separable, and therefore, it is unnecessary for the tag main body and the tag fragment to be manufactured by the same manufacturer at same time. For instance, after the manufacturer attaches the tag main body to a product and ships the product, a retailer may further attach the tag fragment to the tag main body of the product, and sell the product.

Moreover, according to the fourth embodiment, the user can switch over data according to not only opening of the product but also opening/closing of various containers or doors and attachment/detachment of a plug. In addition, the tag main body and the tag fragment can be manufactured separately and connected to each other afterwards.

Furthermore, by employing the tag to a connection portion of each component, it is possible to easily confirm whether, at a manufacturing site, assembly is correctly performed, and whether, at a disassembly site, all the components are disassembled.

FIFTH EMBODIMENT

Figure 16:
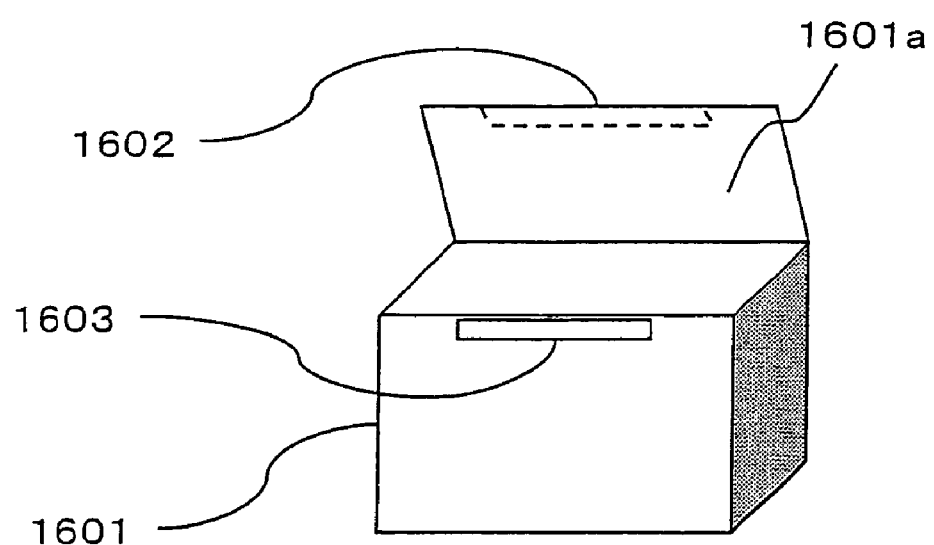
FIG. 16 is a perspective view of an example of a configuration of a container using a state recognition tag according to a sixth embodiment of the present invention.

FIG. 16 shows an example of a configuration of a container using a state recognition tag according to a fifth embodiment of the present invention. A container main body (an example of an engagement unit) 1601 corresponds to, for example, a box of sweets or a corrugated cardboard. The state recognition tag according to any one of the embodiments of the present invention is attached to the container main body 1601 and its cap (an example of another engagement unit) 1601a so as to extend over the container main body 1601 and the cap 1601a. Namely, a tag main body (denoted by reference numeral 1602) of the state recognition tag is arranged near the cap 1601a of the container main body 1601. In addition, a tag fragment (denoted by reference numeral 1603) of the state recognition tag is arranged at a position of the cap 1601a so as to face the tag main body 1602 in a state in which the cap is engaged with the container main body 1601. When the cap 1601a is engaged with the container main body 1601, the tag main body 1602 is connected to the tag fragment 1603, and the control unit has the information holding unit transmit, to a tag reader/writer 1705, information indicating that the cap 1601*a* is engaged with the container main body 1601. When the cap 1601*a* is disengaged from the container main body 1601, the tag main body 1602 is separated from the tag fragment 1603, and the control unit has the information holding unit transmit, to the tag reader/writer 1705, information indicating that the cap 1601*a* is disengaged from the container main body 1601. It is thereby possible to recognize whether the product is opened or unopened.

Figure 17:
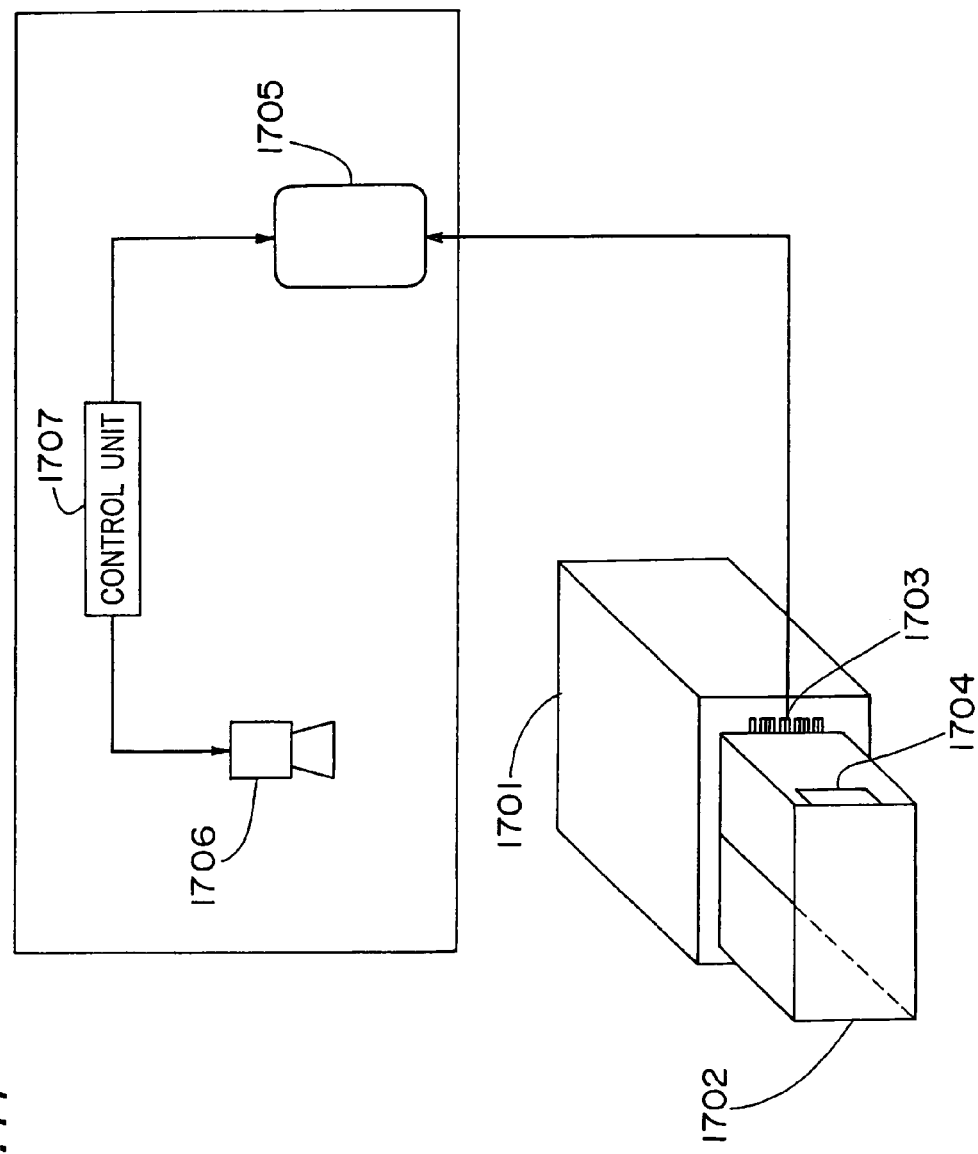
FIG. 17 is a view showing another example of the configuration of the container using the state recognition tag according to the sixth embodiment, and a security system for the container.

FIG. 17 shows another example of the configuration of the container using the state recognition tag according to the fifth embodiment. A container main body 1701 corresponds to, for example, a container box or a drawer of a desk. A tag main body 1703 of the state recognition tag is attached to an inside of an opening portion (an example of an engagement unit) of the container main body 1701. In addition, a tag fragment 1704 is attached to an outside of a drawer (an example of another engagement unit) 1702 which is input and output to and from the opening portion of the container main body 1701 so as to be able to face the tag main body 1703. The container is configured so that, when the drawer 1702 is inserted into the opening portion, the tag main body 1703 can be connected to the tag fragment 1704. When the drawer 1702 is inserted into the opening portion, the tag main body 1703 can be connected to the tag fragment 1704, and the control unit has the information holding unit transmit, to the tag reader/writer 1705, information indicating that the drawer 1702 of the container main body 1701 is inserted into the opening portion. When the drawer 1702 is pulled from the opening portion of the container main body 1701, the tag main body 1703 is separated from the tag fragment 1704, and the control unit thereby has the information holding unit transmit, to the tag reader/writer 1705, information indicating that the drawer 1702 is pulled from the opening portion of the container main body 1701.

By doing so, the user can recognize when the drawer 1702 is pulled from the opening portion and when the drawer 1702 is inserted into the opening portion. Thus, when the information indicating, for example, that the drawer 1702 is pulled from the opening portion is transmitted to the reader/writer 1705, a control unit 1707 that is connected to the tag reader/writer 1705 and that receives a pulling signal from the tag reader/writer 1705 can actuate a monitoring camera 1706. Thus, the state recognition tag is useful not only for management of an article but also strengthening of security.

Figure 18A:
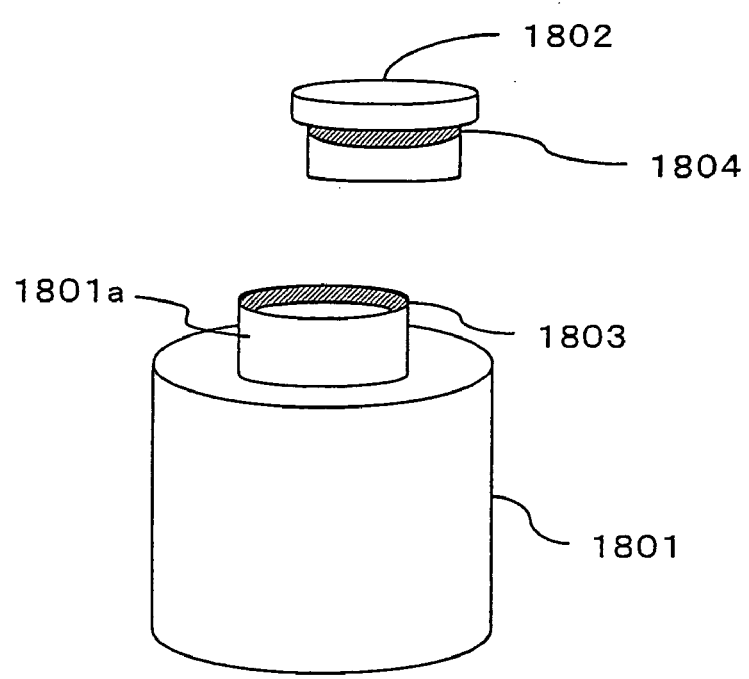
FIG. 18A is a perspective view of another example of the configuration of the container using the state recognition tag according to the sixth embodiment.
Figure 18B:
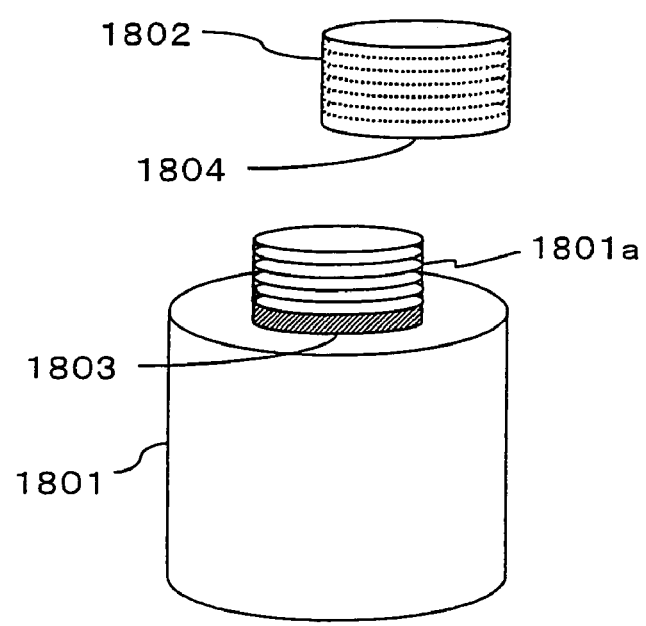
FIG. 18B is a perspective view of another example of the configuration of the container using the state recognition tag according to the sixth embodiment.

Moreover, FIGS. 18A and 18B show another example of the container using the state recognition tag according to the fifth embodiment, respectively. A container main body 1801 corresponds to, for example, a bottle, a can or a PET bottle. A tag main body 1803 of the state recognition tag is attached to an inside or a proximal portion of an opening portion (an example of an engagement unit) 1801*a* of the container main body 1801. A tag fragment 1804 is attached to an outside of a stopper (an example of another engagement unit) 1802. The container is configured so that the tag main body 1803 can be connected to the tag fragment 1804 when the stopper 1802 is engaged with the container main body 1801. When the stopper 1802 is engaged with the container main body 1801, the tag main body 1803 is connected to the tag fragment 1804, and the control unit has the information holding unit transmit, to the tag reader/writer, information indicating that the stopper 1802 is engaged with the container main body 1801. When the stopper 1802 is disengaged from the container main body 1801, the stopper 1802 is disengaged from the container main body 1801, and the control unit thereby has the information holding unit transmit, to the tag reader/writer, information indicating that the stopper 1802 is disengaged from the container main body 1801.

Figure 19A:
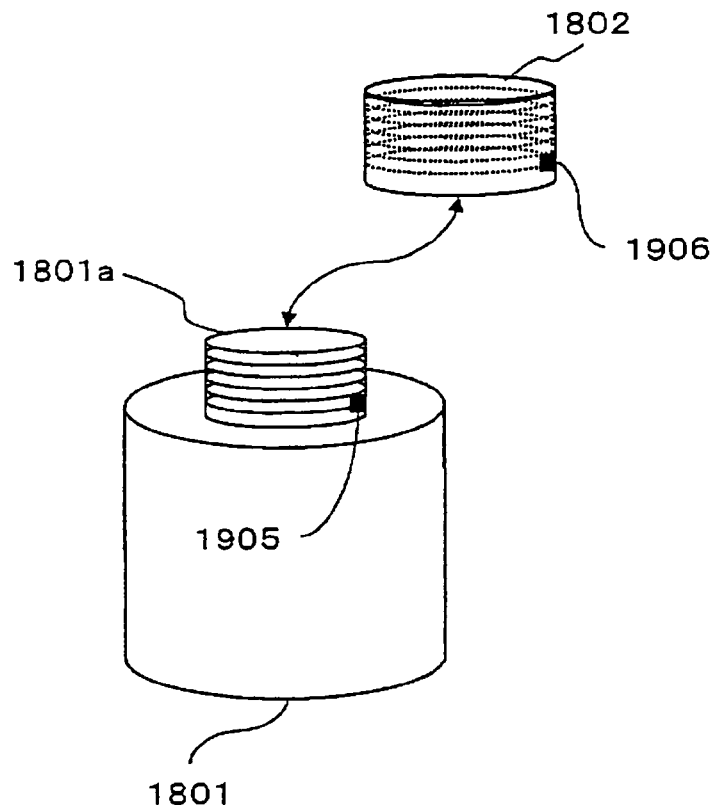
FIG. 19A is a perspective view of another example of the configuration of the container using the state recognition tag according to the sixth embodiment.
Figure 19B:
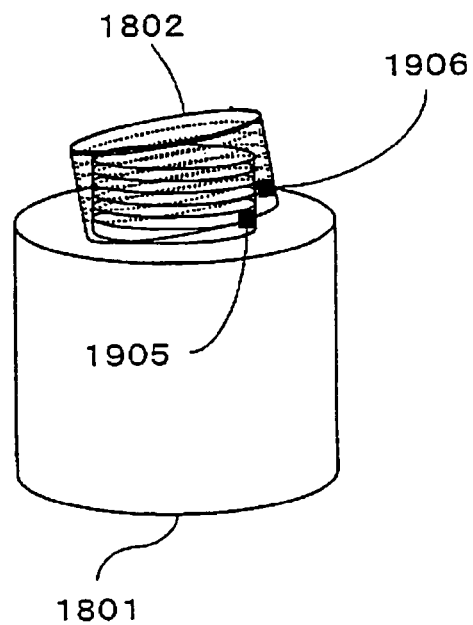
FIG. 19B is a perspective view of another example of the configuration of the container using the state recognition tag according to the sixth embodiment.
Figure 19C:
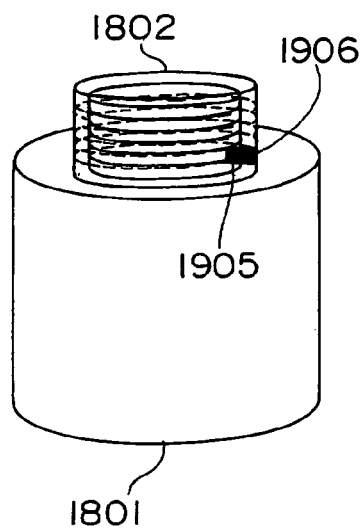
FIG. 19C is a perspective view of another example of the configuration of the container using the state recognition tag according to the sixth embodiment.

FIGS. 19A-19C show states in which the stopper 1802 is engaged with the container main body 1801 shown in FIGS. 18A and 18B, showing a state in which the stopper 1802 is engaged with the container main body 1801 insufficiently, the stopper 1802 is not engaged accurately due to incorrect screwing, and in which a tag main body 1905 fails to become connected to a tag fragment 1906. FIG. 19C further shows a state in which the stopper 1802 is engaged with the container main body 1801 accurately, and, therefore, the tag main body 1905 is connected to the tag fragment 1906. It is thereby possible to manage a period during which the stopper 1802 is disengaged with the container main body 1801, and accordingly, such a container is useful for management of volatile chemicals at ordinary temperature or management of an expiration date of drinkable water. Furthermore, by installing a tag reader/writer on a refrigerator, a control unit connected to the tag reader/writer controls an alarming device to produce an alarm when a PET bottle whose stopper 1802 is not accurately engaged with the container main body 1801 is being put into the refrigerator. Moreover, it is possible to utilize the present invention in recycling of resources by transmitting information on a content of the container when the stopper 1802 is engaged with the container main body 1801, and having the container main body 1801 and the stopper 1802 respectively transmit material information on the container main body 1801 and material information on the stopper 1802.

Figure 20A:
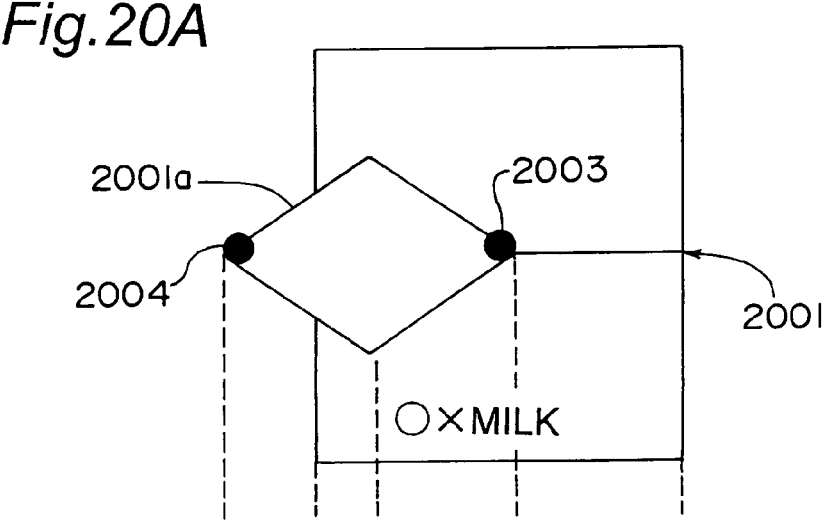
FIG. 20A is a plan view of another example of the configuration of the container using the state recognition tag according to the sixth embodiment in an open state and a closed state.
Figure 20B:
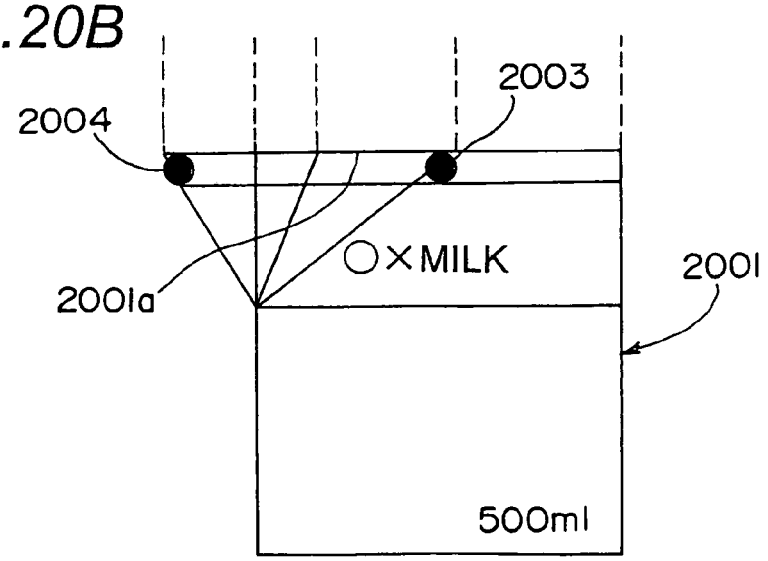
FIG. 20B is a side view of another example of the configuration of the container using the state recognition tag according to the sixth embodiment in an open state and a closed state.
Figure 20C:
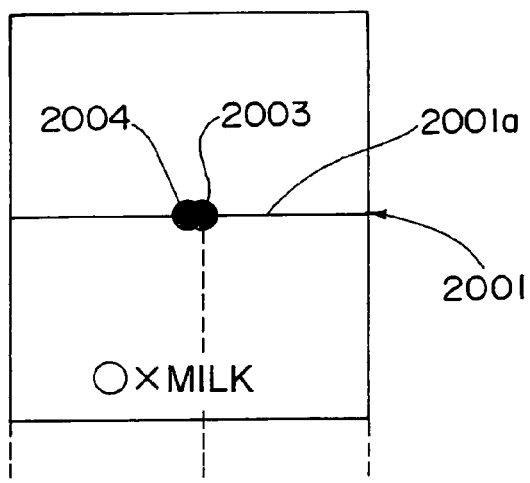
FIG. 20C is a plan view of another example of the configuration of the container using the state recognition tag according to the sixth embodiment in an open state and a closed state.
Figure 20D:
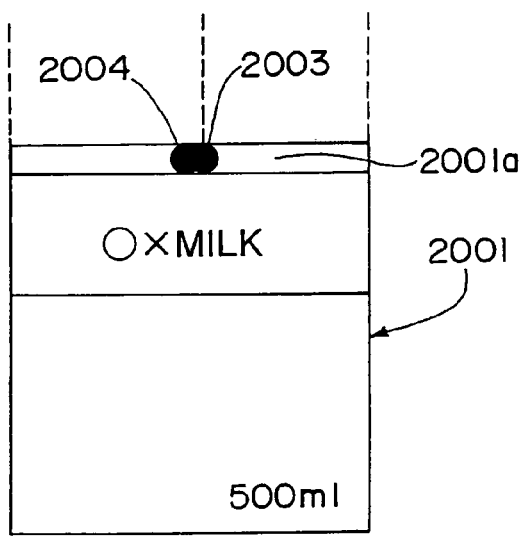
FIG. 20D is a side view of another example of the configuration of the container using the state recognition tag according to the sixth embodiment in an open state and a closed state.

FIGS. 20A to 20D show another example of the configuration of the container using the state recognition tag according to the fifth embodiment. The container corresponds to, for example, a milk carton. FIGS. 20A and 20B show a state in which the milk carton that is the container 2001 is opened. FIGS. 20C and 20D show a state in which the milk carton that is the container 2001 is closed. A tag main body 2003 of the state recognition tag is attached to an inside on one corner of a carton opening portion 2001*a* (an example of an engagement unit) of the container 2001. In addition, a tag fragment 2004 is attached to an inside on the opposite corner (an example of another engagement unit) to the corner on which the tag main body 2002 is attached, of the carton opening portion 2001*a* of the container 2001. The container 2001 is configured so that, when the carton opening portion 2001*a* is closed, the tag main body 2003 can be connected to the tag fragment 2004. When the carton opening portion 2001*a* is closed, the tag main body 2003 is connected to the tag fragment 2004, and the control unit has the information holding unit transmit, to the tag reader/writer, information indicating that the carton opening portion 2001*a* of the container 2001 is closed. When the carton opening portion 2001*a* is open, the tag main body 2003 is separated from the tag fragment 2004, and the control unit thereby has the information holding unit transmit, to the tag reader/writer, information indicating that the carton opening portion 2001*a* is open. The state recognition tag is useful for management of an expiration date of a product after the product is opened, in contrast to a conventional method in which only an expiration date before the product is unopened is handled.

Moreover, an instance in which the container using the state recognition tag according to the fifth embodiment of the present invention is a case that contains therein a plurality of products, e.g., a beer bottle case will be described with reference to FIG. 21.

Figure 21A:
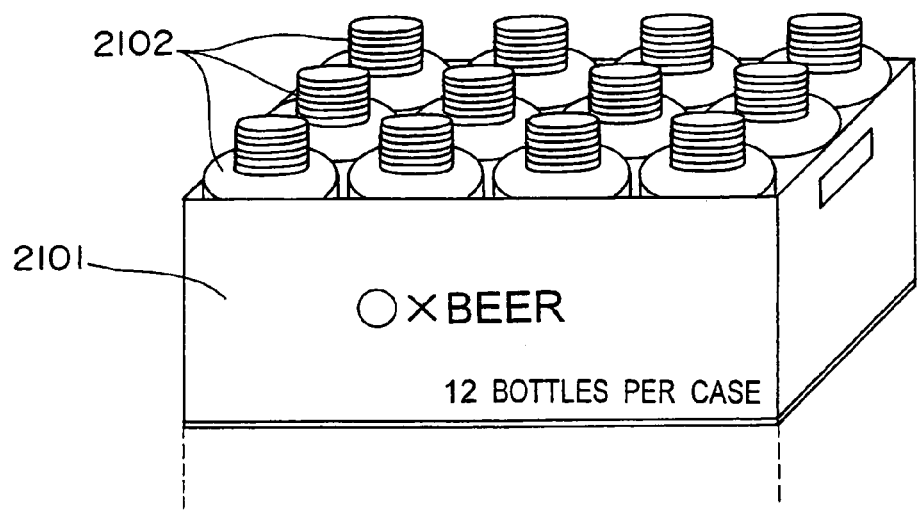
FIG. 21A is a perspective view of the container using the state recognition tag according to the sixth embodiment.
Figure 21B:
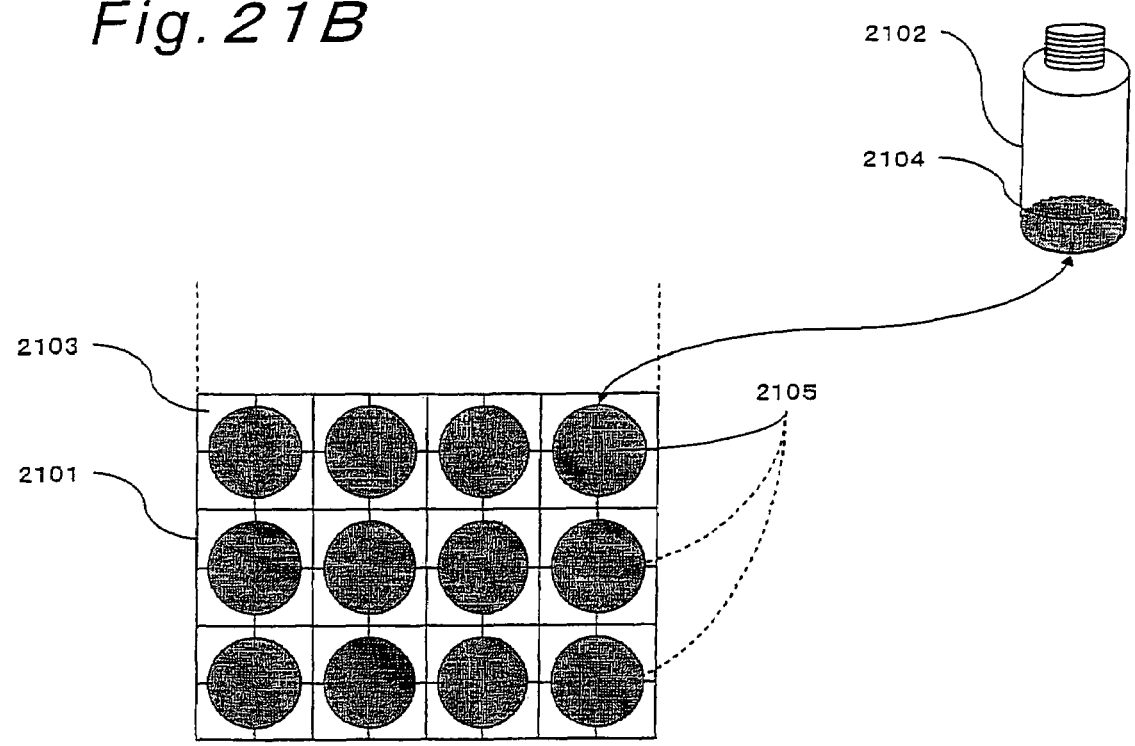
FIG. 21B is a plan view of the container using the state recognition tag according to the sixth embodiment.

FIG. 21 shows an example of the configuration of the container using the state recognition tag according to the fifth embodiment. A container 2101 corresponds to, for example, a beer bottle case. An entire surface of a bottom of the container 2101 (an example of an engagement unit) is a tag main body 2103, and a separation position 2105 is provided at a bottom of each location at which each bottle 2102 is loaded. A tag fragment 2104 is provided at a bottom of the bottle 2102 (an example of another engagement unit). By so configuring, when the bottle 2102 is loaded into the container 2101, the tag fragment 2104 provided at the bottom of the bottle 2102 is connected to the tag main body 2103 at the separation position 2105. The separation-state recognizing unit can thereby recognize that the bottle 2102 is loaded into the container 2101. By doing so, it is possible to grasp how many bottles 2102 are loaded into (contained in) the container. Furthermore, by attaching a gravimeter to each separation position 2105, a residual amount of each bottle 2102 can be checked.

According to the fifth embodiment, the opening/closing state or loading (containing) state of the container can be recognized, and it is possible to accurately manage the article and the expiration date of the article.

It should be noted that the containers shown in FIGS. 14A to 21B and the like are exemplary containers, and that the present invention is applicable to the other containers. Furthermore, the tag main body and the tag fragment can be replaced by each other without any problem.

By properly combining arbitrary embodiments of the aforementioned various embodiments, the effects owned by each of them can be made effectual.

INDUSTRIAL APPLICABILITY

The state recognition tag according to the present invention can change information to be transmitted to the tag reader/writer depending on whether the tag main body is connected to or separated from the tag fragment. The state recognition tag also enables the separated tag fragment to function as a tag. The state recognition tag according to the present invention is, therefore, useful for management of an article accompanied by connection and separation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A state recognition tag comprising:
a tag main body recognizable by a tag reader/writer;
a tag fragment separable from the tag main body and recognizable by the tag reader/writer;
a tag-main-body information holding unit that is provided in the tag main body, for storing information to be transmitted to the tag reader/writer for recognizing the tag main body;
a tag-fragment information holding unit that is provided in the tag fragment, for storing information to be transmitted to the tag reader/writer for recognizing the tag fragment;
a tag-main-body separation-state recognizing unit that is provided in the tag main body, for recognizing a separation state of the tag main body and the tag fragment;
a tag-fragment separation-state recognizing unit that is provided in the tag fragment, for recognizing the separation state of the tag main body and the tag fragment;
a tag-main-body control unit that is provided in the tag main body, for determining whether the tag main body is separated from or connected with the tag fragment based on the separation state recognized by the tag-main-body separation-state recognizing unit, and depending upon a request received from the tag reader/writer, transmitting the separation state recognized by the tag-main-body separation-state recognizing unit to the tag reader/writer or overwriting the information in the tag-main-body information holding unit with information received from the tag reader/writer;
a tag-fragment control unit that is provided in the tag fragment, for determining whether the tag main body is separated from or connected with the tag fragment based on the separation state recognized by the tag-fragment separation-state recognizing unit, and depending upon a request received from the tag reader/writer, transmitting the separation state recognized by the tag-fragment separation-state recognizing unit to the tag reader/writer or overwriting the information in the tag-fragment information holding unit with information received from the tag reader/writer;
a tag-main-body electric power supplying unit that is provided in the tag main body, for supplying electric power to the tag-main-body information holding unit, the tag-main-body separation-state recognizing unit, and the tag-main-body control unit; and
a tag-fragment electric power supplying unit that is provided in the tag fragment, for supplying electric power to the tag-fragment information holding unit, the tag-fragment separation-state recognizing unit, and the tag-fragment control unit.

2. The state recognition tag according to claim 1, wherein, at least one additional tag fragment that include functions similar to functions of the tag fragment is separably connectable to the tag main body or the tag fragment.

3. The state recognition tag according to claim 2, wherein a break at which the tag main body and the tag fragment are separable from each other is provided in a portion in which the tag main body is separated from the tag fragment or a portion in which the tag fragment is separated from the additional tag fragment.

4. The state recognition tag according to claim 2, wherein an engagement structure that includes a first engagement unit and a second engagement unit is provided in a portion in which the tag main body is separated from the tag fragment or a portion in which the tag fragment is separated from the additional tag fragment, the first engagement unit that includes one piece of the portion, the second engagement unit includes being separably engageable with the first engagement unit, reconnectable after separation, and including the other piece of the portion.

5. A container comprising:
a container main body in which the state recognition tag according to claim 2 is arranged; and
a cap that is separably connected to the container main body and in which the other one of the tag main body and the tag fragment is arranged, wherein
when the cap is connected to the container main body, the tag main body is connected to the tag fragment, and
when the cap is separated from the container main body, the tag main body is separated from the tag fragment.

6. The state recognition tag according to claim 1, wherein a break at which the tag main body and the tag fragment are separable from each other is provided in a portion in which the tag main body is separated from the tag fragment.

7. The state recognition tag according to claim 1, wherein an engagement structure that includes a first engagement unit and a second engagement unit is provided in a portion in which the tag main body is separated from the tag fragment, the first engagement unit that includes one piece of the portion, the second engagement unit includes being separably engageable with the first engagement unit, reconnectable after separation, and including the other piece of the portion.

8. A container comprising:
   a container main body in which the state recognition tag according to claim 1 is arranged; and
   a cap that is separably connected to the container main body and in which the other one of the tag main body and the tag fragment is arranged, wherein
   when the cap is connected to the container main body, the tag main body is connected to the tag fragment, and
   when the cap is separated from the container main body, the tag main body is separated from the tag fragment.

* * * * *